United States Patent

Gonjo et al.

[11] Patent Number: 6,159,434
[45] Date of Patent: Dec. 12, 2000

[54] FLAT PLATE STACKED-TYPE FUEL REFORMING APPARATUS

[75] Inventors: Yoshihide Gonjo; Teruo Sugimoto; Minoru Satoh, all of Tokyo, Japan

[73] Assignee: Engineering Advancement Association of Japan Mitsubishi Denki Kabushiki Kaisha, Tokyo, Japan

[21] Appl. No.: 09/021,531

[22] Filed: Feb. 10, 1998

[30] Foreign Application Priority Data

Feb. 28, 1997 [JP] Japan .................................. 9-045898

[51] Int. Cl.[7] .............................. H01M 8/04; B01J 8/04
[52] U.S. Cl. ..................... 422/191; 422/193; 422/200; 48/127.9; 429/20; 429/26
[58] Field of Search ................... 422/177, 191, 422/200, 193, 195, 198; 48/127.7, 198.1, 198.7, 127.9; 252/373; 429/17, 19, 20, 26

[56] References Cited

U.S. PATENT DOCUMENTS

| | | | |
|---|---|---|---|
| 5,015,444 | 5/1991 | Koga et al. | 422/195 |
| 5,209,906 | 5/1993 | Watkins et al. | 422/200 |
| 5,270,127 | 12/1993 | Koga et al. | 429/17 |
| 5,316,747 | 5/1994 | Pow et al. | 423/247 |
| 5,324,452 | 6/1994 | Allam et al. | 252/273 |
| 5,432,021 | 7/1995 | Wilkinson et al. | 429/17 |
| 5,464,606 | 11/1995 | Buswell et al. | |
| 5,470,670 | 11/1995 | Yasumoto et al. | 429/20 |
| 5,482,680 | 1/1996 | Wilkinson et al. | 422/177 |
| 5,609,834 | 3/1997 | Hamada et al. | 422/196 |

FOREIGN PATENT DOCUMENTS

| | | |
|---|---|---|
| 0308976 | 3/1989 | European Pat. Off. . |
| 0529329 | 3/1993 | European Pat. Off. . |
| 5-319801 | 12/1993 | Japan . |
| 6-507145 | 8/1994 | Japan . |
| 7-126001 | 5/1995 | Japan . |
| 7-335238 | 12/1995 | Japan . |
| 2 272 430 | 5/1994 | United Kingdom . |
| WO-92/20617 | 11/1992 | WIPO . |
| WO 94/09523 | 4/1994 | WIPO . |
| WO-94/09523 | 4/1994 | WIPO . |

OTHER PUBLICATIONS

Patent Abstracts of Japan, vol. 95, No. 008, Sep. 29, 1995.

*Primary Examiner*—Hien Tran
*Attorney, Agent, or Firm*—Sughrue, Mion, Zinn, Macpeak & Seas, PLLC

[57] ABSTRACT

A fuel reforming apparatus comprising a liquid feed heating portion, an evaporation portion, a steam superheating portion, a reforming portion, a shift reaction portion, a CO oxidization portion, a catalytic combustion portion, and a heat recovery portion. These portions are constituted by flat plates provided with heat-transfer fins in the interior and are stacked into an integral structure, thereby obtaining a temperature distribution along a stacked direction so that the flat plate elements reach a temperature suitable for reforming, combustion, evaporation, shift, and CO oxidization.

14 Claims, 18 Drawing Sheets

4-1 DRILL

4a : LOW-TEMPERATURE SHIFT PORTION
3 : STEAM SUPERHEATING PORTION

4: MULTILAYER REFORMING PORTION
6a,6b: CATALYTIC COMBUSTION PORTIONS

5: MULTILAYER CO
OXIDATION PORTION

"CO" ALONG THE SELECTIVE OXIDIZER BED WITH WITHOUT SECONDARY AIR

FLAT PLATE STACKED-TYPE FUEL REFORMING APPARATUS

BACKGROUND OF THE INVENTION

1. Field of the Invention

The present invention relates to a fuel reforming apparatus which is employed, for example, for generating hydrogen necessary for portable fuel cells for general power supply or necessary for fuel cells to be mounted in electric automobiles and converts alcohol material or hydrocarbon material to hydrogen-rich, reformed gases.

2. Description of the Related Art

In the conventional fuel reforming apparatus of this kind, there is, for example, the isothermal reactor module of BPS (Ballard Power Systems Inc., Canada) which is suitable for methanol steam reforming reaction, disclosed in Japanese Patent Laid-Open No. 6-507145. FIG. 20 is a rough schematic view of a fuel reforming apparatus provided with an isothermal reactor module. In the figure, 50 is an isothermal reactor module, 51 a heat recovery module, 52 a methanol tank, 53 a water tank, 54 a heat-transfer fluid reservoir, 55 a heat-transfer fluid heater, 58 a reforming reaction passage, 58' a reformed-gas passage, 59 a methanol evaporation passage, 59' a methanol liquid heating passage, 60 a water evaporation passage, 60' a water liquid heating passage, 61 a heat-transfer fluid passage, 62 a supplied-fuel burner, and 63 a steam superheating passage.

The operation of the fuel reforming apparatus of this type will now be described. The heat recovery module 51 supplies methanol and water from the tanks 52 and 53 to the methanol liquid heating passage 59' and the water liquid heating passage 60' with pumps P1 and P2, respectively. The methanol and water are preheated with the reformed-gas passage 58 by the high-temperature reformed gases that come from the isothermal reactor module 50.

The preheated methanol and water are guided to the methanol evaporation passage 59 and the water evaporation passage 60 of the isothermal reactor module 50, in which they are heated and evaporated by the heat-transfer fluid passing through the heat-transfer fluid passage 61. The heat-transfer fluid is sent from the heat-transfer fluid reservoir 54 to the heat-transfer heater 55. In the heat-transfer heater 55, the heat-transfer fluid is heated by the supplied-fuel burner 62.

After being heated, the heat-transfer fluid is sent to the isothermal reactor module 50 and used as a heat source for evaporation and reforming. Thereafter, heat-transfer fluid is returned to the reservoir 54 and again is circulated to the heat-transfer fluid heater 55 by a pump P3. Methanol and water are mixed together after evaporated in the methanol evaporation passage 59 and the water evaporation passage 60, and the mixture is supplied to the steam superheating passage 63, in which it is heated up to an optimum temperature of reforming reaction. The heat necessary for evaporation and heating is supplied by the heat-transfer fluids passing through the heat-transfer fluid passages 61 provided on both sides of the methanol evaporation passage 59, the water evaporation passage 60 and the steam superheating passage 63.

Thereafter, steam comprising the heated methanol and water is supplied to the reforming reaction passage 58 of the isothermal reactor module 50, and by using an appropriate reforming catalyst (e.g., catalyst of Cu-Zn), the endothermic reaction of methanol steam ($CH_3OH + H_2O \rightarrow 3H_2 + CO_2$) is performed. The heat necessary for the reforming reaction is supplied by the heat-transfer fluids passing through the heat-transfer fluid passages 61 provided on both sides of the reforming reaction passage 58.

Thereafter, the reformed gases are sent to the heat recovery module 51, and the gases are cooled down to a suitable temperature (usually 100° C. or less) for being supplied to fuel cells, by the heat exchange between the reformed gases and methanol-water.

A plan view of this isothermal rector module 50 is shown in FIG. 21, a plan view of a heat-transfer fluid plate is shown in FIG. 22, and a partial exploded side view is shown in FIG. 23. In the figures, 61 is a heat-transfer fluid passage, 61' a heat-transfer fluid passage plate, 31 a sealing sheet, 27 a heat-transfer fin, 66 a baffle plate, 67 a housing (shown by hatching in the figures), and 33 a reforming catalyst. The isothermal reactor module 51 is constituted by the sealing sheet 31, baffle plate 66 with heat-transfer fins 65, housing 67 enclosing substantially the circumference of a heat-transfer surface, and heat-transfer fluid passage plate 61' having the heat-transfer fluid passage 61 interiorly.

As shown in FIG. 22, an array of parallel passage grooves provided in the interior of the heat-transfer fluid plate 61' are arranged with a pattern in which outgoing passages and incoming passages alternately appear, and the grooves form the heat-transfer fluid passage, thereby averaging the temperature distribution within the surface of the heat-transfer fluid plate. The heat of the heat-transfer fluid is transferred through the heat-transfer fins 27 to the reforming catalyst 33, whereby the heat necessary for reforming reaction is supplied.

The baffle plate 66 fills the heat-transfer fins 27 with the reforming catalysts 33, also forms a meandering or labyrinthine passage, and allows the reformed gases to pass through the passage. As shown in the plan view of FIG. 21, the heat-transfer fins 27 form a plurality of concentric, arcuate walls on the baffle plate 66. This increases the velocity of the reformed gases at a predetermined space speed, and consequently, the thickness of the boundary layer along the wall of the passage is reduced, the heat transfer from the wall to the reformed gases is accelerated, and the methanol reforming rate is enhanced.

In the case where reformed gases are generated by methanol steam reforming reaction and a solid polymer type fuel cell is operated, the reformed gases contain a large amount of carbon monoxide (CO) which poisons the electrode catalyst of the fuel cell and therefore reduces the cell life, so there is a need to reduce the concentration of the CO in the reformed gases to about 10 ppm.

As the conventional fuel reforming apparatus of this kind, a method and apparatus for selectively oxidizing the carbon monoxide present in a hydrogen-containing gas mixture, proposed by the aforementioned BPS incorporation, is disclosed in Japanese Patent Laid-Open No. 7-502205. In this method of oxidizing carbon monoxide (CO), oxygen or an oxygen-containing gas mixture is introduced at locations on the way to the latter portion of the isothermal reactor, and CO is oxidized to carbon dioxide, thereby reducing CO concentration. A cross sectional view of the selective oxidizing reactor of this invention is shown in FIG. 24. In the figure, 69 is a fin block, 70 an air distribution plate, 72 a reformed gas inlet portion, 73 a reformed gas outlet portion, and 74 a plurality of secondary air inlet portions.

In this oxidization method of CO, a primary amount of oxygen-containing gases (for example, air) are premixed into reformed gases (gas mixture containing hydrogen, $CO_2$, and CO) and are guided to the inlet 72 of the selective oxidizing reactor. Then, the reformed gases are contacted with the catalyst in the selective oxidizing reactor to promote the oxidization of CO, and a further amount of oxygen or an oxygen-containing mixture is introduced into the reaction chamber through a plurality of secondary air inlet portion.

The selective oxidizing reactor is constituted by the fin block 69 contacting the air distribution plate 70. The fin block 69 has a plurality of heat-transfer fins extending from the bottom portion to the direction of the air distribution plate, and the heat-transfer fins are joined with the air distribution plate to form a meandering or labyrinthine channel therebetween.

The bottom portion of the fin block 69 includes heat-transfer fluid passages 61 for supplying heat to the interior of the selective oxidizing reactor or removing heat from the selective oxidizing reactor. The carbon monoxide (CO) concentration distribution of the selective oxidizing reactor obtained by this oxidization method of CO is shown in FIG. 25. For the CO concentration distribution without secondary air, the carbon monoxide (CO) concentration increases significantly at some point along the passage through the reactor, as indicated by a solid line in FIG. 25.

It is believed that this increase is due to the effect of reverse shift reaction (H2+CO2→CO+H2O). The addition of secondary air along the pathway significantly reduces the CO concentration (as indicated by a two-dotted line in FIG. 25), and a low CO concentration of about 10 ppm is shown at the outlet.

In another conventional fuel reforming apparatus, there is, for example, a fuel reforming apparatus which suppresses the CO concentration in reformed gases to a relatively lower level, as disclosed in Japanese Patent Laid-Open No. 7-126001. The structure of this fuel reforming apparatus is shown in FIG. 26. In this apparatus, an evaporation portion 75, a reforming-shifting portion 76, and an oxidizing-removing portion 77 are made as stacked structures of an evaporating layer 78 and a heating layer 79, a reforming-catalyzing layer 80 and a heating layer 81, and an oxidizing-catalyzing layer 82 and a heating layer 83, respectively, and are integrally connected along with a combustion portion 84.

This structure is capable of reducing the size of the apparatus compared with the aforementioned conventional apparatuses, also suppressing the thermal loss of the heat-source gases generated in the combustion portion 84, and making efficient use of heat. In the reforming-shifting portion 76, the CO concentration in reformed gases is suppressed, and even at the oxidizing-removing portion 77, the remaining CO concentration is reduced down to approximately 100 ppm of the CO concentration level that is supplied to fuel cells.

The CO concentration control means of the reforming-shifting portion 76 controls the amount of the heat-source gases from the combustion portion, which is introduced into the reforming-shifting portion 76, in correspondence with the CO concentration in reformed gases, and varies the temperature distribution within the reforming-catalyzing layer to vary the ratio of a reforming reaction region and a shift-reaction region, thereby adjusting the CO concentration of reformed gases.

Also, as described in Japanese Patent Laid-Open No. 7-335238, a stacked plate type fuel reforming apparatus has been provided as another conventional fuel reforming apparatus. This apparatus is provided with a reforming reaction portion, a partial oxidization-reaction portion, and a catalytic combustion portion. In this apparatus, the stacked structure of the fuel reforming apparatus, the operation method relative to load variation when the apparatus is started and operated, the vaporization method of liquid fuel, the integral structure between the reforming apparatus and a fuel cell, the mixing method of fuel and air, and the flow adjusting means of the material gas that is supplied to the reforming portion are described.

In addition, to improve the workability and producibility of the apparatus, the elements forming the apparatus are constituted by flat plate elements employing heat-transfer fins. Furthermore, as described in Japanese Patent Laid-Open No. 5-319801, in the name of a stacked type methanol reformer, the structure of a methanol reformer with reforming cell units and heating cell units alternately stacked is proposed as still another conventional fuel reforming apparatus.

However, in the isothermal reactor module of the conventional fuel reforming apparatus disclosed in Japanese Patent Laid-Open No. 6-507145, since the isothermal reactor module is heated indirectly by heat-transfer fluid, attached devices, such as a reservoir, pumps, and a heat-transfer fluid heater, and piping become necessary and therefore there arises the problem that the construction of the entire system becomes complicated.

Also, although the baffle plate, the seal sheet, and the heat-transfer fins (a plurality of arcuate walls) have been provided in the interior of the reactor to increase the linear velocity of reformed gases and to increase the heat transfer from the walls to the reformed gases, there arise the problems that the structure and configuration of the members are complicated and workability suitable for mass production is unobtainable.

In addition, in the selective oxidizing method and apparatus of the carbon monoxide (CO) in reformed gases disclosed in Japanese Patent Laid-Open No. 7-502205, while secondary air has been introduced at locations on the way to the latter portion of the isothermal reactor to promote the oxidization of carbon monoxide (CO), a plurality of secondary air inlet portions such as those shown in FIG. 24 are needed due to the introduction of secondary air and therefore flow control devices of the same number as the inlet portions become necessary.

Additionally, since the isothermal reactor is provided separately from the fuel reforming apparatus and operated under isothermal conditions, heating fluid and cooling fluid become necessary, so there arise the problems that the entire system is complicated and structure suitable for mass production is unobtainable.

Moreover, in the fuel reforming apparatus disclosed in Japanese Patent Laid-Open No. 7-126001, the carbon monoxide (CO) concentration in reformed gases is about 100 ppm and therefore is still in a high-concentration level in order to operate a solid polymer type fuel cell, so that a further reduction in the carbon monoxide (CO) concentration becomes necessary.

While the CO concentration control means has controlled the amount of the heat-source gases from the combustion portion which are introduced into the reforming-shifting portion 76 in correspondence with the CO concentration in reformed gases, the amount of the heat-source gases that flow to the combustion portion is determined by the heat necessary for reforming reaction and necessary for vaporization of liquid feed, and cannot be varied arbitrarily. Consequently, it is difficult to independently control the amount of the heat-source gases with this structure.

In addition, oxidization of carbon monoxide (CO) is exothermic reaction, and in order to maintain the inlet temperature of the CO oxidization portion at a temperature (250° C. or less) suitable for CO oxidization, a portion which becomes an endothermic source of 200° C. or less becomes necessary.

Moreover, in the fuel reforming apparatuses disclosed in Japanese Patent Laid-Open No. 5-319801 and Japanese Patent Laid-Open No. 7-335238, apparatus miniaturization is achieved, but since any means has not been taken of a CO reduction in the reformed gases, these apparatuses are insufficient as a fuel reforming apparatus that is employed in solid polymer type fuel cells.

BRIEF SUMMARY OF THE INVENTION

Object of the Invention

This invention has been made in order to solve problems such as described above. A first object of this invention is to provide a compact, flat plate stacked type fuel reforming apparatus by constituting different functions, such as a reforming portion, a catalytic combustion portion, an evaporation portion, and a CO reducing portion, with flat plate elements and also by integrally stacking the flat plate elements. Thus, the first object is to render external heat exchangers unnecessary. Also, the first object is to provide a fuel reforming apparatus suitable for mass production, by constituting the passages of flat plate elements by employing light alloy heat-transfer fins, suitable for pressing, in the interior of a flat plate and also employing manifolds, suitable for stamping, in the outer circumferential portion of the flat plate.

In addition, a second object of this invention is to provide a fuel reforming apparatus for directly supplying heat by the catalytic combustion of fuel cell off-gases (hydrogen-poor gases exhausted from a fuel electrode after use of a fuel cell) without using heat-transfer fluid which indirectly supplies heat necessary for reforming and evaporation. Also, the second object is to provide a fuel reforming apparatus for effectively utilizing the exhaust heat of combustion gases and the generation of heat due to CO oxidization in the vaporization (heating, evaporation, and superheating) of liquid feed and for reducing radiant heat to the outside of the apparatus.

Furthermore, a third object of this invention is to provide a fuel reforming apparatus which is capable of setting the temperature distribution of a CO oxidization portion to an timum temperature range for CO oxidization corresponding to a CO concentration level in order to reduce the CO concentration of reformed gases to an allowable value of a fuel cell, for example, to less than a few parts per million, and also which is capable of dispersedly supplying CO oxidization air with simple structure suitable for mass production and without having a complicated control mechanism.

SUMMARY OF THE INVENTION

To achieve the foregoing and other objects, the fuel reforming apparatus according to the present invention comprises elements which include: a liquid feed heating portion for heating liquid feed which comprises water and alcohol or hydrocarbon; an evaporation portion for evaporating the heated liquid feed to generate reformed gases; a steam superheating portion for superheating the methanol-water vapor from an evaporation temperature to a reforming temperature; a reforming portion for generating hydrogen-rich reformed gases from the superheated methanol-water vapor by reforming catalysts; a catalytic combustion portion for supplying reforming heat to the reforming portion and evaporation heat to the evaporation portion from heat generated by catalytic combustion; a shift reaction portion for reducing carbon monoxide (CO) contained in the reformed gases generated by the reforming portion; a CO oxidization portion for reducing the CO contained in the reformed gases emerging from the shift reaction portion by catalytic oxidization; and a heat recovery portion for using exhaust heat of high-temperature combustion gases obtained by the combustion of the catalysts as heat sources for the steam superheating portion and the evaporation portion. The elements are formed into flat plate elements made of a light alloy, and the flat plate elements have a manifold for performing intake and exhaust with respect to surroundings and also have heat-transfer fins in the interior. The elements are integrally stacked in close proximity to one another from a high-temperature side to a low-temperature side in order of the catalytic combustion portion, reforming portion, steam superheating portion, heat recovery portion, shift reaction portion, evaporation portion, CO oxidization portion, and liquid feed heating portion.

In the fuel reforming apparatus according to the invention, the catalytic combustion portion may also be divided into a plurality of portions and inserted between the reforming portion and the steam superheating portion, and a fuel portion of the catalytic combustion portion and the reforming portion may also be stacked in contact with each other.

In the fuel reforming apparatus according to the invention, the catalytic combustion portion may also be divided into a plurality of portions and inserted between the shift reaction portion and the evaporation portion, and a fuel portion of the catalytic combustion portion and the evaporation portion may also be stacked in contact with each other.

In the fuel reforming apparatus according to the invention, the heat recovery portion may also be divided into a plurality of portions and inserted between the evaporation portion and the CO oxidization portion, and the heat recovery portion and the evaporation portion may also be stacked in contact with each other.

In the fuel reforming apparatus according to the invention, the heat recovery portion may also be divided into a plurality of portions and inserted between the evaporation portion and the shift reaction portion, and the heat recovery portion and the evaporation portion may also be stacked in contact with each other.

In the fuel reforming apparatus according to the invention, when stacking the flat plate elements of the catalytic combustion portion, reforming portion, steam superheating portion, heat recovery portion, shift reaction portion, evaporation portion, CO oxidization portion, and liquid feed heating portion, at least one of the reforming portion and catalytic combustion portion may also be provided in the center of the stacked body, and the other flat plate elements may also be symmetrically disposed on the upper and lower layers of either the reforming portion or the catalytic combustion portion.

In the fuel reforming apparatus according to the invention, the CO oxidization portion, reforming portion, and shift reaction portion each may also be constituted by a flat plate element having heat-transfer fins fixed to the interior, each heat-transfer fin being filled on the inner side with a CO oxidization catalyst, a reforming catalyst, or a shift catalyst. The heat recovery portion and steam superheating portion each are constituted by a flat plate element having a combustion gas passage and a steam passage formed with heat-transfer fins alone. A plurality of flat plate elements are stacked by providing at least one fluid turn-back passage in a stacked direction of the flat plate elements so that fluid, such as combustion gases, liquid feed steam, and reformed gases, turns back at an end of the flat plate element, when the fluid passes the inner side of each heat-transfer fin.

In the fuel reforming apparatus according to the invention, the CO oxidization portion comprises flat plate elements provided with one or more turn-back passages, an evaporation portion is provided in contact with the flat plate element of an inlet of the CO oxidization portion into which the reformed gases flow, a liquid feed heating portion is provided in contact with the flat plate element of an outlet of the CO oxidization portion from which the reformed gases flow out, a heat conductor is provided on a boundary surface where the flows of the reformed gases and the liquid feed and steam become opposite flows, and a heat insulator is provided on a boundary surface where the flows of the reformed gases and the liquid feed and steam become parallel flows, thereby obtaining temperature distribution which is high in temperature at the inlet portion and low in temperature at the outlet portion in the stacked direction of the CO oxidization portion and in the directions of the reformed gases and the liquid feed and steam.

In the fuel reforming apparatus according to the invention, the CO oxidization portion dispersedly supplies CO oxidization air in correspondence with the CO concentration distribution along a direction of flow in the CO oxidization portion, by alternately stacking a plurality of turn-back passages of reformed-gas chambers and CO oxidization air chambers so that the flows of the reformed gases and the CO oxidization air become parallel flows and also by providing a CO oxidization air dispersion plate with a plurality of dispersion holes between flat plate elements of the reformed-gas chambers and the CO oxidization air chambers so that the air amount distribution in the stacked direction is controlled by the configuration of the dispersion hole and the passage resistance of a fluid passage leading to the dispersion hole.

In the fuel reforming apparatus according to the invention, a surface-division heat recovery portion, constituted by dividing a surface of the heat recovery portion into an evaporation catalytic combustion portion and a combustion gas heat recovery portion, may also be provided in close proximity to an upper or lower portion of the evaporation portion. The catalytic combustion portion and the combustion gas heat recovery portion for evaporation are alternately disposed on the surface along a flow of steam on the evaporation surface of the evaporation portion.

In the fuel reforming apparatus according to the invention, an evaporation temperature corresponding to liquid feed may also be set by varying the ratio of the area of the evaporation catalytic combustion portion to the combustion gas heat recovery portion in the surface-division heat recovery portion.

In the fuel reforming apparatus according to the invention, the evaporation portion is constituted by two stages, a liquid feed evaporation portion and a water evaporation portion. A surface-division heat recovery portion is formed by dividing a surface of the heat recovery portion into an evaporation catalytic combustion portion and a combustion gas heat recovery portion. The liquid feed evaporation portion and the water evaporation portion are provided in close proximity to the surface-division heat recovery portion, respectively. CO oxidization portions are stacked between the liquid feed evaporation portion and the water evaporation portion and outside the liquid feed evaporation portion and the water evaporation portion, respectively.

In the fuel reforming apparatus according to the invention, the ratio of the area of the evaporation catalytic combustion portion to the combustion gas heat recovery portion is reduced at a portion adjacent to the liquid feed evaporation portion where the evaporation temperature is low, and is increased at a portion adjacent to the water evaporation portion where the evaporation temperature is high.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

First embodiment

Figure 1A:
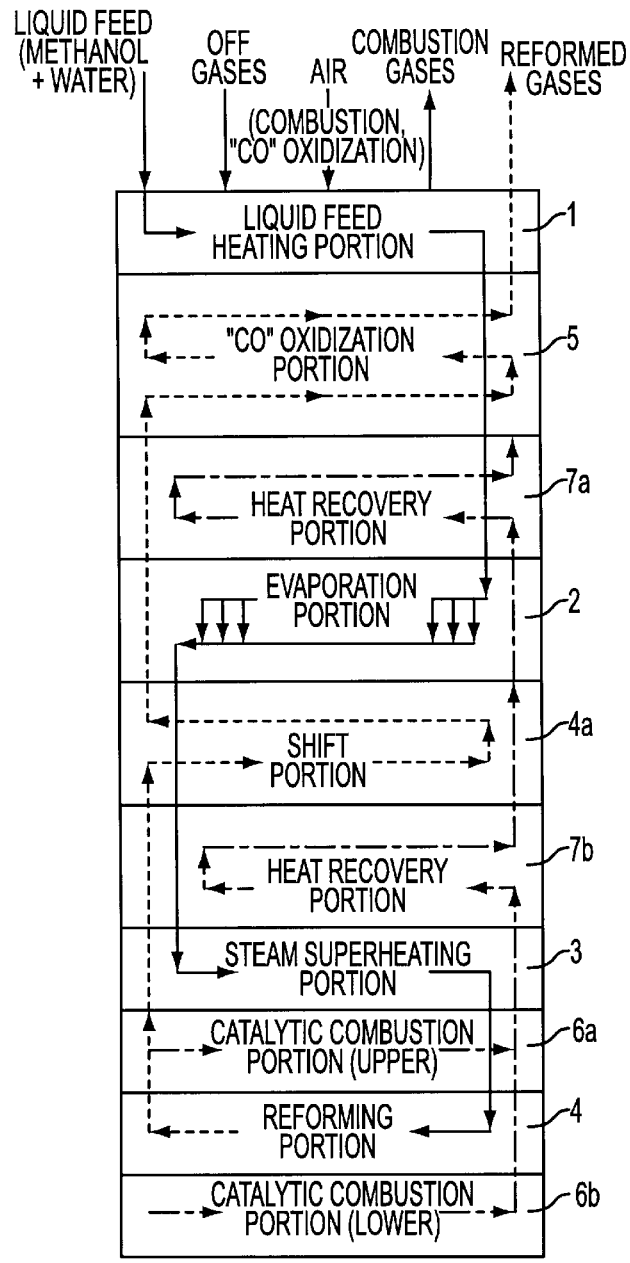
FIG. 1A is a diagram showing the basic constitution of a fuel reforming apparatus according to a first embodiment of the present invention.

A first embodiment of a fuel reforming apparatus according to this invention will hereinafter be described with the case where liquid feed is methanol and water. The block diagram on the left side in FIG. 1 is a schematic view showing the whole of the fuel reforming apparatus according to this embodiment and shows the basic layout of the constituent elements. Also, the graph on the right side in FIG. 1 is a diagram showing the temperature distribution along the stacked direction of the flat plate elements of the fuel reforming apparatus. In FIG. 1 a liquid feed heating portion 1 preheats supplied liquid feed (methanol and water), by performing the heat exchange between the liquid feed and the reformed gases passing through an adjacent carbon monoxide (CO) oxidization portion 5.

The preheated liquid feed evaporate in an evaporation portion 2 by the exhaust heat of the combustion gases of a low-temperature heat recovery portion 7a and the heat generated in the CO oxidization portion 5. Furthermore, the steam of the liquid feed is superheated up to 300° C. in a steam superheating portion 3 employing a high-temperature heat recovery portion 7b and a catalytic combustion portion 6a as the heat source. This superheated steam is supplied to a reforming portion 4. With the heat supplied from catalytic combustion portions 6a and 6b, the reforming portion 4 converts the steam (methanol and water) by reforming reactionto carbon dioxide, a minor amount of carbon monoxide, and hydrogen.

The reformed gases emerging from the reforming portion 4 are introduced into a shift reaction porion 4a, and, after water and carbon monoxide have been converted to carbon dioxide and hydrogen, the reformed gases are guided to the CO oxidization portion 5, in which the remaining CO is converted to CO2 by oxidation. At the inlet of the CO oxidization portion 5, heat exchange is performed between the reformed gases and the steam for combustion gases), and at the outlet, heat exchange is performed between the reformed gases and the liquid feed. After a temperature distribution suitable for CO oxidization has been maintained, the reformed gases are reduced to the concentration of carbon monoxide (CO) less than an allowable level for fuel cells and are supplied to the fuel electrode of a fuel cell.

In FIG. 1, a solid line represents a flow of liquid feed and superheated steam, a broken line a flow of reformed gases, and a one-dotted chain line a flow of combustion gases.

A description will now be made of the operation of the fuel reforming apparatus according to this embodiment. Liquid feed; methanol and water, are supplied to the liquid feed heating portion 1. Then, methanol and water are beforehand adjusted and set in quantity, respectively, so that the rate becomes a predetermined steam-carbon ratio (for example, 1.5). Methanol and water are preheated in the fluid material heating portion 1 by the heat exchange between the liquid feed and the reformed gases flowing through the adjacent CO oxidization portion 5.

The preheated liquid feed is evaporated in the evaporation portion 2. The heat necessary for this evaporation is supplied mainly by the exhaust heat of the combustion gases of the low-temperature heat recovery portion 7a and the heat generated in the CO oxidization portion 5. The temperature necessary for the evaporation is 150 to 200° C. Therefore, since the inlet temperature of the CO oxidization portion 5 rises to 240° C. or more and the combustion gas temperature of the low-temperature heat recovery portion 7a also rises to 250° C. or more, the exhaust heat of the combustion gases of the low-temperature heat recovery portion 7a and the heat generated in the CO oxidization portion 5 are in a sufficiently high temperature level as the heat source for the liquid feed evaporation. Also, the temperature of the reformed gases flowing through the shift reaction porion 4a is 200 to 250° C. and sufficiently high, so it can be utilized as part of the heat source.

In the steam superheating portion 3 the steam comprising methanol and water is superheated up to a reforming temperature of 300° C. For this reason, the high-temperature recovery portion 7b and the catalytic combustion portion 6a are provided on both sides of the steam superheating portion 3 as heating sources. The combustion gases of the catalytic combustion portion 6a have a high temperature of 300° C. or more and therefore has heat enough to superheat steam up to 300° C. The superheated steam is supplied to the reforming portion 4, and the vapor comprising methanol and water is converted to hydrogen and carbon dioxide by reforming reaction. The heat needed for the reforming reactionis supplied by the catalytic combustion portions 6a and 6b provided on the upper and lower layers of the reforming portion 4.

In the catalytic combustion portions 6a and 6b, the combustion gases are exhausted from the fuel electrode of the fuel cell, and cell off-gases containing unutilized hydrogen (hereinafter referred to as Off-gases) are burned with air for combustion and employed as a heating source for reforming reaction. The temperature of the reforming portion 4 is a temperature (about 300° C.) which can reduce the CO concentration of the reformed gases down to less than the allowable level of a fuel cell in the following shift reaction porion 4a and CO oxidization portion 5 and also can ensure a high reformation rate (of more than 99%) relative to the amount of the generated reformed gases. To set the temperature of the reforming portion 4 to a suitable temperature, the temperatures of the catalytic combustion portions 6a and 6b are set by adjusting the combustion amount of air (air ratio) of the catalytic combustion portions 6a and 6b.

The reformed gases emerging from the reforming portion 4 are introduced into the shift reaction porion 4a, and the carbon monoxide (CO) and water in the reformed gases are converted to carbon dioxide and hydrogen by shift reaction. From chemical equilibrium, as temperature becomes lower, the shift reaction advances toward the side of carbon dioxide. In the case where a shift catalyst consisting of a Cu-Zn system is employed, the shift reaction porion 4a is provided between the evaporation portion 2 (200° C.) and the high-temperature heat recovery portion 7b (250° C.), because a temperature of 200 to 250° is required in order to ensure a sufficient reaction rate.

Before the reformed gases emerging from the shift reaction portion 4a enter the CO oxidization portion 5, air for CO oxidization is introduced. The amount of the CO oxidization air that is supplied is an amount of air (three to four times a theoretical amount of air) equivalent to an amount more than an amount necessary for oxidizing the CO present in the reformed gases. The CO oxidization portion 5 is provided between the liquid feed heating portion 1 and the low-temperature heat recovery portion 7a (and the evaporation portion 2) so that the temperature of the CO oxidization portion 5 is within a range of 110 to 240° C. suitable for CO oxidization, which is the result obtained from the experiments made by the inventors.

At the inlet of the CO oxidization portion 5, heat exchange is performed between the reformed gases and steam with a temperature of 150 to 200° C. and between the reformed gases and combustion gases with a temperature of 250° C., and at the outlet, heat exchange is performed between the reformed gases and low-temperature liquid feed, thereby maintaining a temperature distribution suitable for CO oxidization. The reformed gases with the CO concentration reduced to less than the allowable level of a fuel cell at the outlet of the CO oxidization portion 5 are supplied from the fuel reforming apparatus to the fuel electrode of the fuel cell.

Figure 1B:
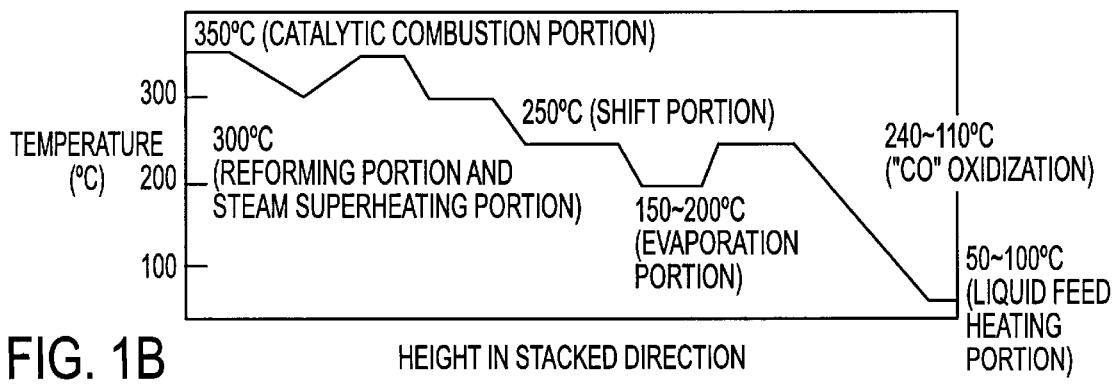
FIG. 1B is a diagram showing the temperature distribution in a stacked direction.

In FIG. 1A, while the catalytic combustion portion 6a comprising a plurality of divided flat plate elements has been provided between the reforming portion 4 and the steam superheating portion 3 and also the low-temperature heat recovery portion 7a comprising a plurality of divided flat plate elements has been provided between the evaporation portion 2 and the CO oxidization portion 5, the stacked order of the flat plate elements is not limited to FIG. 1A. If a suitable temperature distribution is realized with each of the flat plate elements, the constitution may also be any constitution in which the divided catalytic combustion portion 6a and low-temperature heat recovery portion 7a are not installed.

In the case where heat becomes insufficient at some position along the stacked direction of the flat plate elements and therefore a lower temperature than a suitable temperature relative to the functions of the flat plate elements occurs, a smooth temperature distribution can be formed continuously in the stacked direction by providing a flat plate element (catalytic combustion portion 6a, heat recovery portions 7a and 7b, CO oxidization portion 5) on the heating side in close proximity to the flat plate element whose temperature is insufficient.

Figure 2:
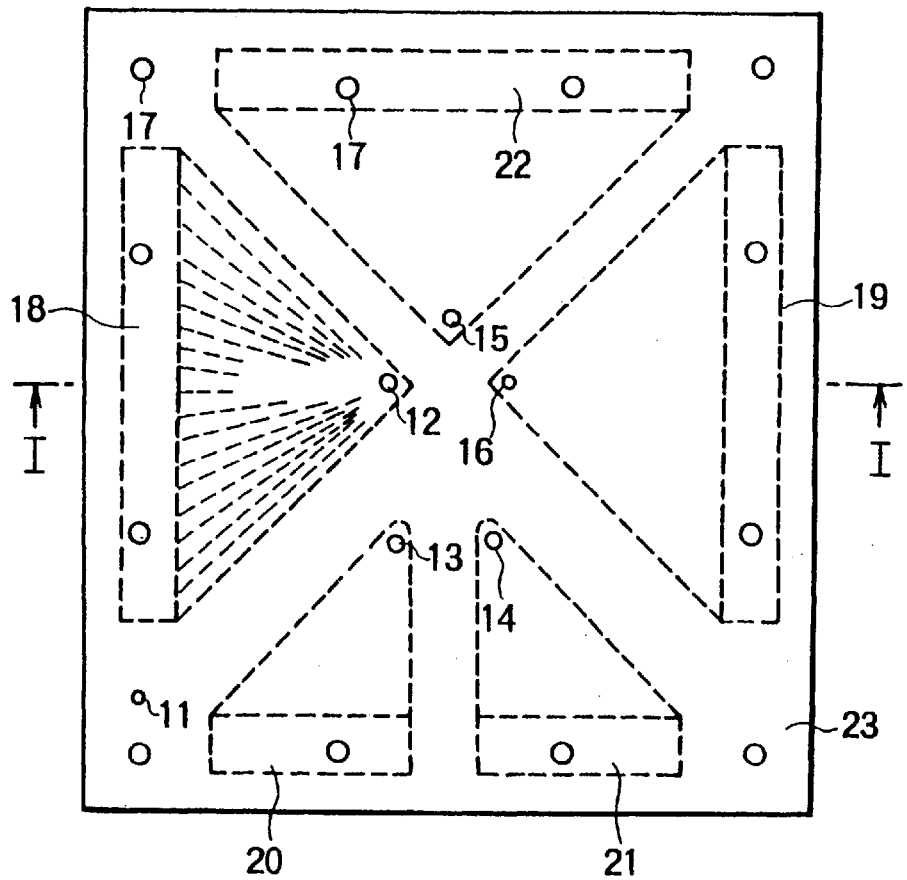
FIG. 2 is a top plan view showing the upper end plate of the fuel reforming apparatus according to the first embodiment of the present invention.
Figure 3:
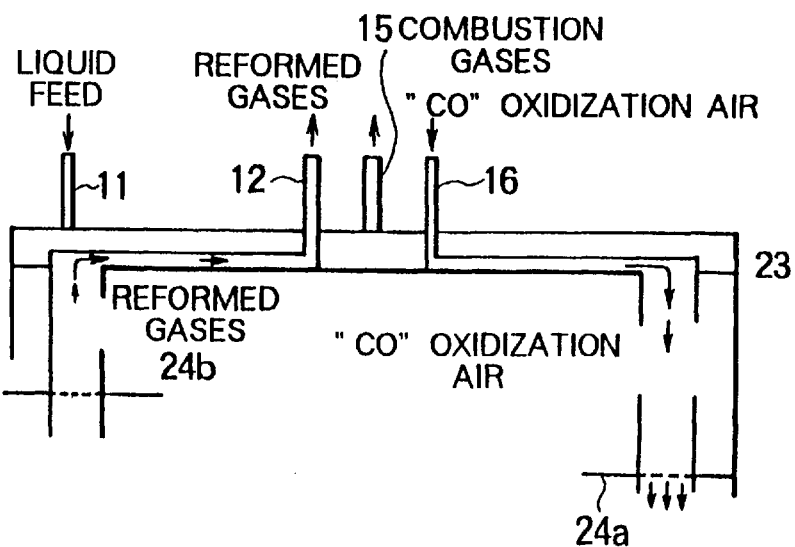
FIG. 3 is a sectional view showing the upper end plate of the fuel reforming apparatus according to the first embodiment of the present invention.

A description will now be made of an upper end plate that performs the intake and exhaust of liquid feed, gases, and air in the fuel reforming apparatus according to this embodiment. The structure of the upper end plate 23 is shown in FIGS. 2 and 3. FIG. 2 is a plan view of the upper end plate 23 and FIG. 3 a sectional view showing an A–A' section of FIG. 2. In the interior surface of the upper end plate 23, intake and exhaust tubes 12 through 16 and manifolds 18 through 22 corresponding to these intake and exhaust tubes 12 through 16 are provided in the following layout relationship.

The reformed-gas outlet manifold 18 is constituted by a rectangular opening formed in a longitudinal direction along the left edge of the interior surface of the upper end plate 23 and a plurality of guide portions disposed so that the reformed gases sent from the opening are converged at approximately the center of the upper end plate 23. Also, the reformed-gas exhaust tube 12 for exhausting the converged reformed gases from the reformed-gas outlet manifold 18 to the exterior of the upper end plate 23 is provided.

The CO oxidization air supply tube 16 for supplying CO oxidization air from the exterior of the upper end plate 23 to the interior is arranged on the same line as the reformed-gas exhaust tube 12 with a predetermined spacing. Also, there is provided the CO oxidization air manifold 19, which is constituted by a rectangular opening formed in a longitudinal direction along the right edge of the interior surface of the upper end plate 23 and a plurality of guide portions disposed radially with respect to the opening so that the CO oxidization air supplied by the CO oxidization air supply tube 16 spreads out and flows evenly.

Furthermore, in the interior surface of the upper end plate 23, the combustion gas exhaust manifold 22 is constituted by a rectangular opening formed in a longitudinal direction along the upper edge and a plurality of guide portions disposed so that the combustion gases sent from the opening are converged at approximately the center of the upper end plate 23. Also, the combustion gas exhaust tube 15 for exhausting the converged combustion gases from the combustion gas exhaust manifold 22 to the exterior of the upper end plate 23 is provided.

Below the reformed-gas exhaust tube 12, there are provided both the OFF-gas supply tube 13 for supplying Off-gases from the exterior of the upper end plate 23 to the interior and the Off-gas supply manifold 20. The Off-gas supply manifold 20 is constituted by a rectangular opening formed in a longitudinal direction along the lower edge of the interior surface of the upper end plate 23 and a plurality of guide portions disposed radially with respect to the opening so that the Off-gases supplied by the Off-gas supply tube 13 spread out and flow evenly.

The combustion air supply tube 14 for supplying combustion air from the exterior of the upper end plate 23 to the interior is provided on the same line as the Off-gas supply tube 13 with a predetermined spacing. Also, there is provided the combustion air supply manifold 21, which is constituted by a rectangular opening formed in a longitudinal direction along the lower edge of the interior surface of the upper end plate 23 and a plurality of guide portions disposed radially with respect to the opening so that the supplied combustion air spreads out and flows evenly.

The liquid feed supply tube 11 is stood up in the exterior of the upper end plate 23 toward the interior, and attaching holes 17 for attachment support shafts are bored in the exterior of the upper end plate 23 along the edges of the plate with a predetermined spacing.

A description will now be made of the gas intake and exhaust of this fuel reforming apparatus. The upper end plate 23 collectively performs the intake and exhaust of fluid, such as liquid feed, reformed gases, Off-gases, air, and combustion gases. The intake and exhaust tubes 12 through 16 for these fluids are collected on the central portion of the upper end plate 23. The interior of the upper end plate 23 is provided with a portion where air and Off-gases spread from the supply tubes 13, 16, and 14 toward the surrounding manifolds 20, 19, and 21 and a portion where reformed gases and combustion gases are converged from the surrounding manifolds 18 and 22 to the exhaust tubes 12 and 15.

The manifolds 18 through 22 are provided on the four circumferential edges of the upper end plate 23 (see FIG. 2) so that the intake and exhaust of gas are reliably performed in the effective reaction area located in the central portion of the upper end plate 23. In addition, to make the flow in the manifolds 18 through 22 even, the width may also be sufficiently widened, or bored plates 24a and 24b (see FIG. 3) for making flow even may also be provided within the manifolds 18 through 22.

In addition, in the circumferential portion of the upper end plate 23, the support-shaft attaching holes 17 for fastening the lower constituent flat plate element and ensuring the seal between the flat plate elements are bored, and fastening support shafts and presser members (spring, nut, bearing, etc.) are provided. The fastening support shafts are attached at the four corners of the flat plate and inside each manifold, and fastening weight is adjusted so that the surface pressure to the effective reaction area of the flat plate element becomes even.

Figure 4:
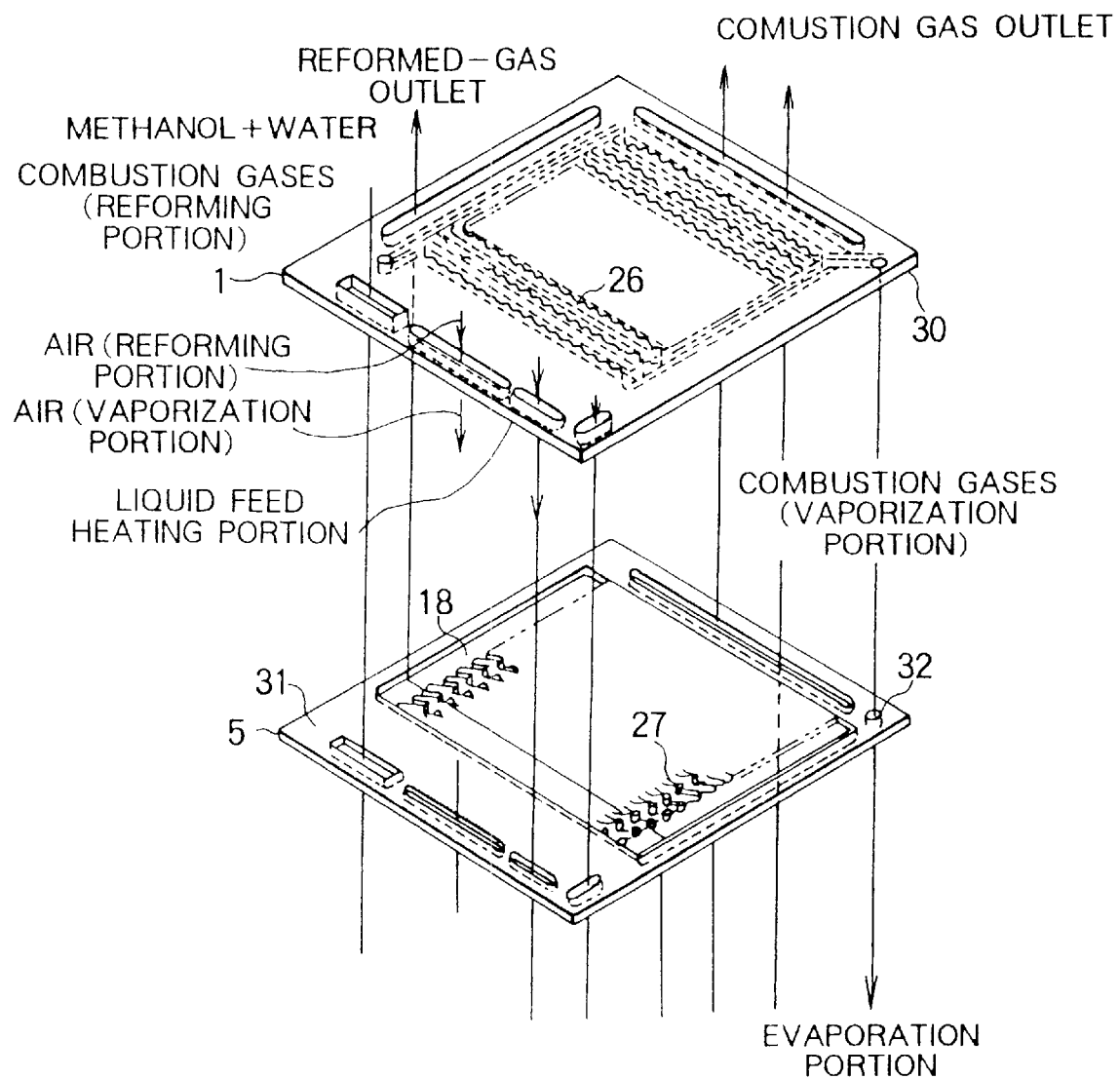
FIG. 4 is a perspective view showing the structure of flat plate elements of a liquid feed heating portion and a CO oxidization portion (outlet portion) according to the first embodiment of the present invention.

The structure of the flat plate elements of the fuel reforming apparatus will now be described with respect to the liquid feed heating portion 1 and the CO oxidization portion 5. The structure of the CO oxidization portion 5 adjacent to the liquid feed heating portion 1 of the fuel reforming apparatus according to this embodiment is shown in FIG. 4. In the interior of the liquid feed heating portion 1, fluid passages 26 for introducing supplied liquid feed is formed by a plurality of long and narrow passages. The introduced liquid feed is sent through the liquid passages 26 to the evaporation portion 2. The bottom surface of the liquid feed heating portion 1 is provided with a partition wall 30 for partitioning liquid feed and reformed gases.

In addition, on the surface of the CO oxidization portion 5, there are arranged or formed heat-transfer fins 27 for transferring heat to the liquid feed heating portion 1, reformed-gas outlet manifold 18 for sending out reformed gases to the reformed-gas outlet of the liquid feed heating portion 1, a seal sheet 31 for preventing the reformed gases and the liquid feed, and the air, Off-gases, and combustion gases passing through the manifolds, from leaking to the outside or other portions, and a liquid supply port 32 for supplying preheated liquid feed to the evaporation portion 2.

A description will be made of the operations of the liquid feed heating portion 1 and the CO oxidization portion 5. Liquid feed; methanol and water, is supplied from the upper end plate to the liquid feed heating portion 1. Then, the liquid feed is preheated by the heat exchange between the liquid feed and the reformed gases flowing through the outlet portion of the adjacent CO oxidization portion 5. The liquid feed heating portion 1 is supposed to have structure where the flat surface thereof is provided with a plurality of narrow liquid passages 26 through which liquid feed pass. The widths of the liquid passages 26 are adjusted in order to make the flow within the surface even.

The preheated liquid feed is supplied from a liquid feed supply port 32 located at the corner of the CO oxidization portion 5 to the evaporation portion 2. The circumference of the flat plate of the liquid feed heating portion 1 is provided with manifolds for reformed gases, Off-gases, air, and combustion gases. The flat surface of the CO oxidization portion 5 is provided with heat-transfer fins 27 having offset intermittent surface fins in the stacked direction, as shown in FIG. 4, and the inner side of the heat-transfer fin 27 is filled with a CO oxidization catalyst (not shown in FIG. 4).

The CO oxidization catalyst can use catalysts, such as platinum in an alumina carrier, ruthenium, palladium, and rhodium. The reformed gases flow between the heat-transfer fins 27 and the CO oxidization catalyst within the surface and are exhausted from the reformed-gas outlet manifold 18. The reformed-gas outlet manifold 18 is connected with the upper end plate 23. Thus, heat exchange is performed between the reformed gases and the liquid feed, and the reformed gases are cooled to near 80°, which is the operating temperature of a fuel cell. Between the liquid feed heating portion 1 and the CO oxidization portion 5, the partition plate 30 and the seal sheet 31 are provided. The partition plate 30 is used to partition the liquid feed and the reformed gases.

Also, to make the heat transfer efficiency of the reformed gases to the liquid feed better, the liquid feed heating portion 1 is fastened to the CO oxidization portion 5 by the support shafts of the upper end plate 23, and the partition plate 30 is closely contacted with the surfaces of the heat-transfer fins 27, thereby reducing thermal resistance. The seal sheet 31 has a configuration where the heat-transfer fin portion (effective reaction area) and the manifold portions are cut out from the circumference of the flat surface, also is closely attached to the circumferential portion of the flat plate by the fastening weight, and prevents the reformed gases and the liquid feed, and the air, Off-gases, and combustion gases flowing through the manifolds from leaking to the outside or other portions.

While the material of the seal sheet 31 has employed, for example, Teflon, it is not limited to Teflon if sealability equal to or higher than that of Teflon is maintained. Also, it is preferable that the material of the flat plate elements constituting the liquid feed heating portion 1, CO oxidization portion 5, heat-transfer fins 27, and partition plate 30 be aluminum with better thermal conductivity and light weight or an aluminum alloy, however, material other than aluminum, such as a copper alloy and a brass alloy, can be used if thermal conductivity and a reduction in weight equal to aluminum are achieved. Furthermore, the flat plate element has manifolds on the circumference and heat-transfer fins in the interior so that it is suitable for pressing and stamping, thereby enhancing workability and producibility.

Figure 5:
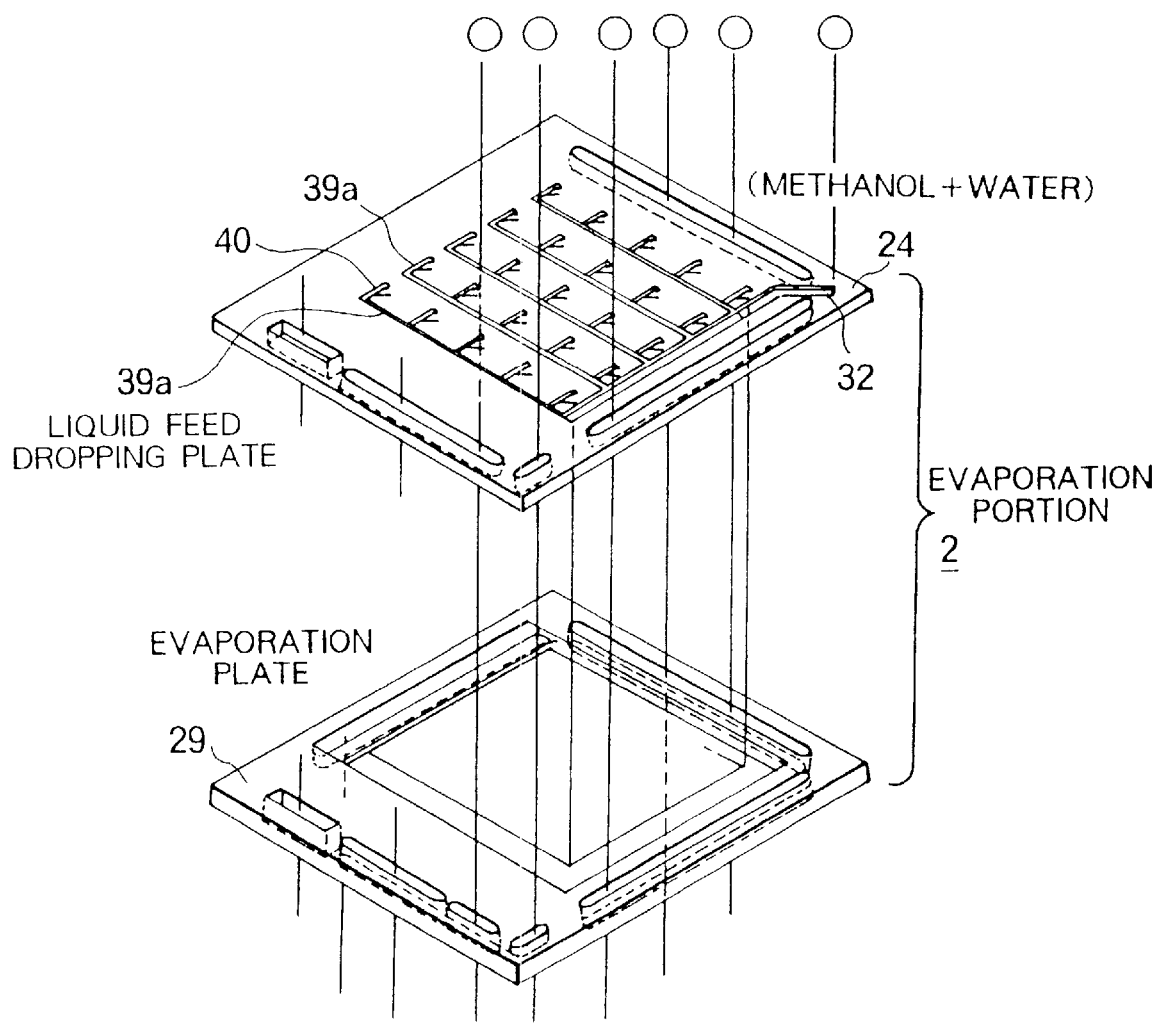
FIG. 5 is a perspective view showing the structure of an evaporation portion according to the first embodiment of the present invention.

The structure of the evaporation portion 2 of the fuel reforming apparatus according to this embodiment is shown in a part-perspective view of FIG. 5. The evaporation portion 2 is constituted by stacking a liquid feed dropping plate 24 and an evaporation plate 29. The evaporation portion 2 adopts structure where methanol and water evaporate evenly within the flat surface. In this embodiment, the liquid feed drop plate 24 is employed as a fluid dispersion plate and disperses an amount of fluid supplied within the flat surface, thereby making both evaporation and an endothermic distribution due to evaporation even. The evaporation portion 2 is constituted by two flat plate elements: liquid feed dropping plate 24 and evaporation plate 29.

The liquid feed dropping plate 24 is formed with a liquid feed supply port 32 which is a supply port for the preheated liquid feed supplied through the liquid feed heating portion 1 and the CO oxidization portion 5. Also, the plate 24 is formed with dispersion holes 39a for dropping which evenly introduce the liquid feed, supplied from the liquid feed supply port 32, to the flat surface and drop the liquid feed within the flat surface of the lower evaporation plate 29. Furthermore, the liquid feed dropping plate 24 is formed with a passage 40 which adjusts the amount of the liquid feed that go toward the dispersion holes 39a.

To perform the evenness of evaporation within a surface and the dispersion evenness of an amount of drop, the liquid feed dropping plate 24 of the evaporation portion 2 adjusts the groove width of the fluid passage 40 and the hole diameter of the dispersion hole 39a, thereby making the drop amount distribution approximately even. In this embodiment, the liquid feed drop plate 24 is provided within the surface with 25 (5 rows 5) dispersion holes 39a through which liquid feed drop. The liquid drops of the liquid feed evaporate on the lower evaporation plate 29, and the evaporation within the surface is made even.

Also, the evaporation plate 29 is provided with a plurality of surface protrusions within the surface, and the protrusion has an enlarged uneven heat-transfer surface. The liquid feed is dropped from the liquid drop hole between the protrusions, thereby promoting the evaporation. The heat necessary for evaporation is supplied from the CO oxidization portion 5 and heat recovery portion 7a adjacent to the evaporation portion 2, and the heat is supplied to the evaporation surface past a plurality of surface protrusions within the evaporation plate 29.

Figure 6:
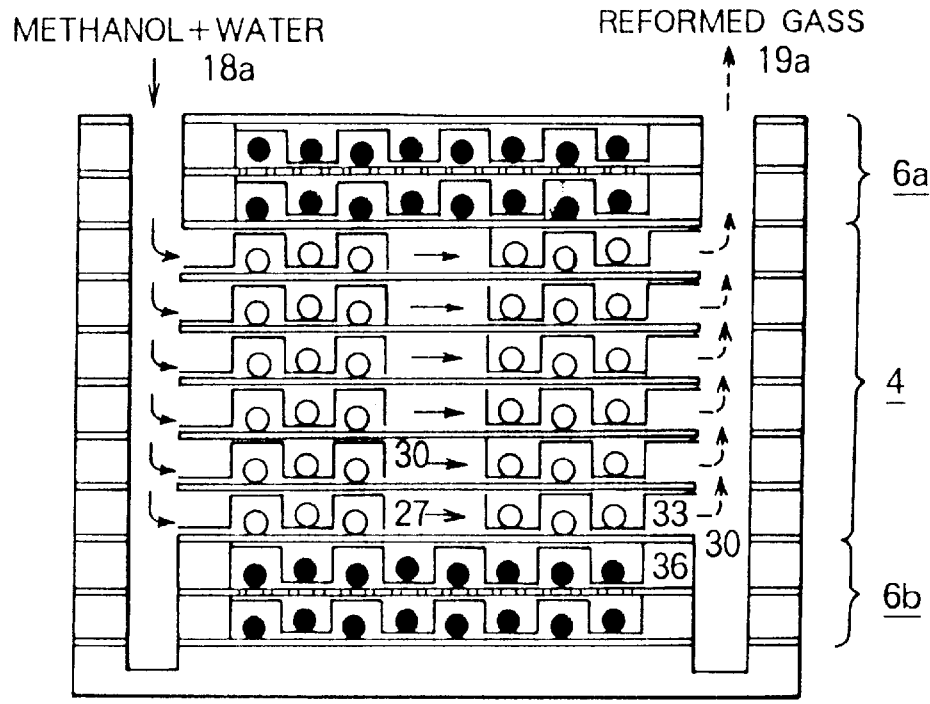
FIG. 6 is a schematic view showing the structure of a reforming portion and the flow of reformed gases according to the first embodiment of the present invention.
Figure 7:
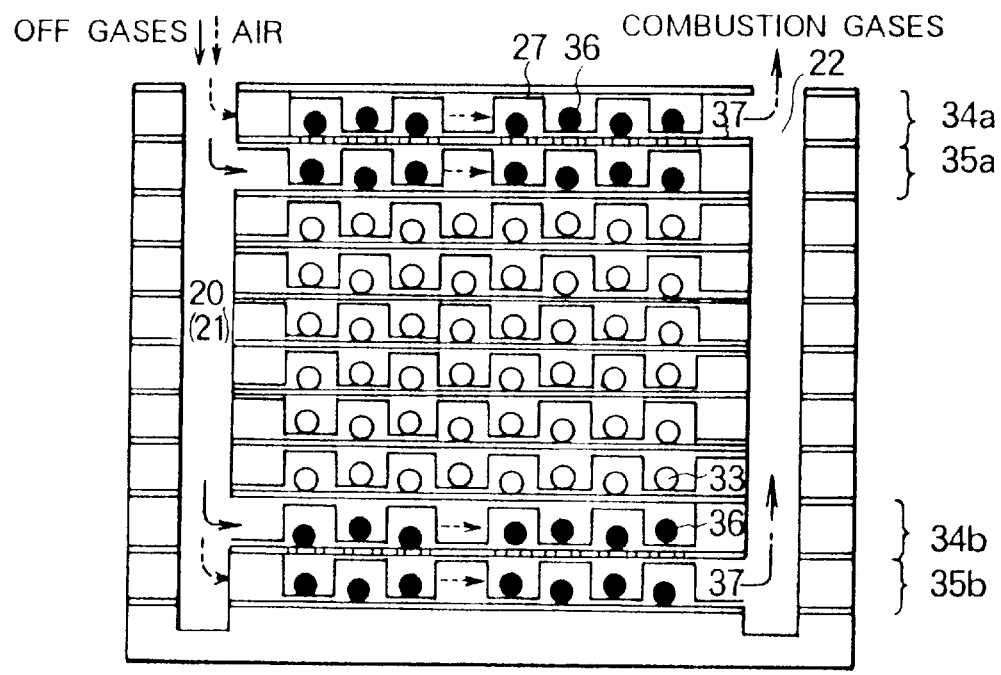
FIG. 7 is a schematic view showing the structure of a catalyst combustion portion and the flows of Off- gases, air, and combustion gases according to a fourth embodiment of the present invention.

A description will be made of the multilayer reforming portion 4 and the catalytic combustion portions 6a and 6b of the fuel reforming apparatus according to this embodiment. The structures of the multilayer reforming portion 4 and the catalytic combustion portions 6a and 6b of the fuel reforming apparatus are shown in FIGS. 6 and 7. FIG. 6 shows the flows of methanol, water vapor, and reformed gases in the multilayer reforming portion 4, and FIG. 7 shows the flows of Off-gases, air, and combustion gases in the catalytic combustion portions 6a and 6b.

In the multilayer reforming portion 4, 18a represents a superheated-steam supply manifold. The liquid feed supplied from this superheated-steam supply manifold 18a are passed through a plurality of reforming catalysts 33 each surrounded by the heat-transfer fins 27, and the reformed gases are exhausted from the reformed-gas exhaust manifold 19a.

Also, the multilayer reforming portion 4 is constituted by filling the inner side of the heat-transfer fin 27 with the reforming catalyst 33 and also by stacking a plurality of flat plate elements in which partition plates 30 each are provided between heat-transfer fins 27 superimposed in the stacked direction. The reforming catalyst 33 can use copper chromium oxide in alumina carrier, and zinc-system catalysts. The superheated steam comprising methanol and water is supplied from the superheated-steam supply manifold 18a to the multilayer reforming portion 4. In the superheated steam comprising methanol and water, methanol and water are converted to hydrogen and carbon dioxide by the action of reforming catalyst, and consequently, hydrogen-rich reformed gases are obtained.

In this embodiment, the reformed gases are caused to flow from the superheated-steam supply manifold 18a, which is the inlet of the multilayer reforming portion 4, and then flow through the layers of the multilayer reforming portion 4 in parallel. The distributed reformed gases are merged at the exhaust manifold 19a, which is the outlet of the multilayer reforming portion 4. Thereafter, the merged reformed gases are supplied to the following shift reaction porion 4a. The heat necessary for the reforming reaction is supplied from the catalytic combustion portions 6a and 6b provided up and down of the multilayer reforming portion 4 and is transferred to the reforming catalysts 33 through the heat-transfer fins 27. Since the multilayer reforming portion 4 is heated from both sides by the catalytic combustion portions, the stacked-direction temperature distribution of the multilayer reforming portion 4 is high in temperature at the upper and lower ends adjacent to the catalytic combustion portions 6a and 6b and becomes lower at the central portion.

A large temperature distribution in the stacked direction will result in an unevenness in the reforming reactionand a reduction in the reforming rate. Therefore, by using aluminum with better thermal conductivity or the alloy in the heat-transfer fins 27 and the partition plates 30 and making the heat transfer efficiency of the fin higher, the stacked-direction temperature distribution is made smaller. For the stacked number of the multilayer reforming portions 4, it will suffice if the stacked number is one which is capable of sufficiently supplying reforming reactionheat with the upper and lower catalytic combustion portions 6a and 6b and also making the stacked-direction temperature distribution smaller to such a degree that reforming rate is not reduced.

The catalytic combustion portion 6a, as shown in FIG. 7, is constituted by both a combustion chamber 34a which supplies Off-gases and an air chamber 35a which supplies air. A dispersion plate 37 is provided between the combustion chamber 34a and the air chamber 35a, and Off-gases and air for combustion are supplied separately into the combustion chambers through the dispersion plate 37. Each of the chambers 34a and 35a is provided with heat-transfer fins 27, and the inner side of the heat-transfer fin 27 is filled with a combustion catalyst 36.

The combustion catalyst 36 can use catalysts, such as platinum in an alumina carrier, ruthenium, palladium, and rhodium. The cell off-gases and air necessary for Off-gas combustion are individually supplied from the respective supply manifolds to the combustion chamber 34a and the air chamber 35a, and the gas combustion is performed, while mutually diffusing gases and air within a surface through the dispersion holes of the dispersion plate 37.

The temperatures of the combustion chamber 34a and the air chamber 35b of the catalytic combustion portions 6a and 6b effectively transmit combustion heat to reforming heat, because the temperature of the combustion chamber with high-concentration hydrogen becomes higher. In the case where the catalytic combustion portions 6a and 6b and the multilayer reforming portion 4 are stacked with each other, they are arranged so that the combustion chamber 34a contacts the reforming portion 4. The Off-gases and air are distributed into the two upper and lower catalytic combustion portions 6a and 6b, respectively, and the multilayer reforming portion 4 is heated from both sides. The lower catalytic combustion portion 6b is constituted by combustion chamber 34b and air chamber 35b.

Figure 8A:
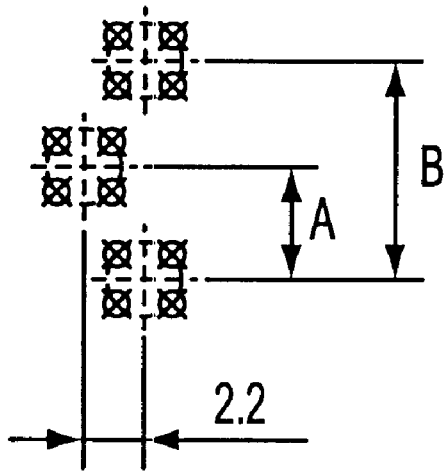
FIGS. 8A and 8B are diagrams showing the configuration of the dispersion plate of a catalytic combustion portion according to the first embodiment of the present invention.
Figure 8B:
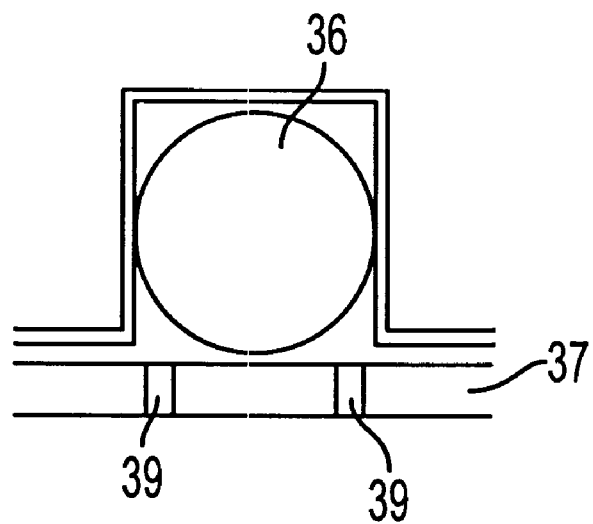

A description will now be made of the catalytic combustion portions 6a and 6b according to this embodiment. FIGS. 8A and 8B show a structure example of the dispersion plate of the catalytic combustion portion and a pattern example of the dispersion holes. In the figure, 37 is a dispersion plate, 36 a combustion catalyst, and 39 a dispersion hole. The dispersion plate 37 in this example is provided with four dispersion holes with a diameter of 1.0 mm around the circumference of a single combustion catalyst. From tests made by the inventors, with respect to the position between the combustion catalyst 36 and the dispersion holes 39a, in order to prevent the dispersion holes 39 from being closed by the combustion catalyst 36, the dispersion holes 39 are not provided at the positions at which the combustion catalyst 36 contacts the dispersion plate, but it is necessary to provide the dispersion holes 39 around the circumference of the combustion catalyst.

If the dispersion hole 39 is closed by the combustion catalyst 36, then Off-gases and air will not be mixed and diffused and a high combustion rate cannot be achieved. If the dispersion holes 39 are provided around the combustion catalyst 36, air and Off-gases will be supplied to the surface of the combustion catalyst 36, while they are mutually diffusing and mixing past the dispersion holes 39, and consequently, a high combustion rate can be achieved. In addition, by burning Off-gases and air while mutually diffusing them by the dispersion plate 37, superheat due to excessive combustion reaction at the inlet portion is suppressed, thereby achieving even combustion. Note that surface temperature distribution can also be made even by giving surface distribution to the size of the dispersion hole 39 and also matching the exothermic distribution of the combustion with the endothermic distribution of the reforming portion 4.

In this embodiment, while the catalytic combustion portion has been divided into the upper catalytic combustion portion 6a and the lower catalytic combustion portion 6b and also the upper catalytic combustion portion 6a has been inserted between the steam superheating portion 3 and the reforming portion 4, the upper catalytic combustion portion 6a may also be inserted between the evaporation portion 2 and the shift reaction porion 4a so that the evaporation in the evaporation portion 2 is further promoted and stabilized.

Also, in this embodiment, although the heat recovery portion has been divided into the heat recovery portion 7a and the heat recovery portion 7b and the heat recovery portion 7a has been interposed between the CO oxidization portion 5 and the evaporation portion 2, the heat recovery portion 7a may also be interposed between the evaporation portion 2 and the shift reaction portion 4a so that the evaporation in the evaporation portion 2 is further promoted and stabilized.

Second embodiment

Figure 9:
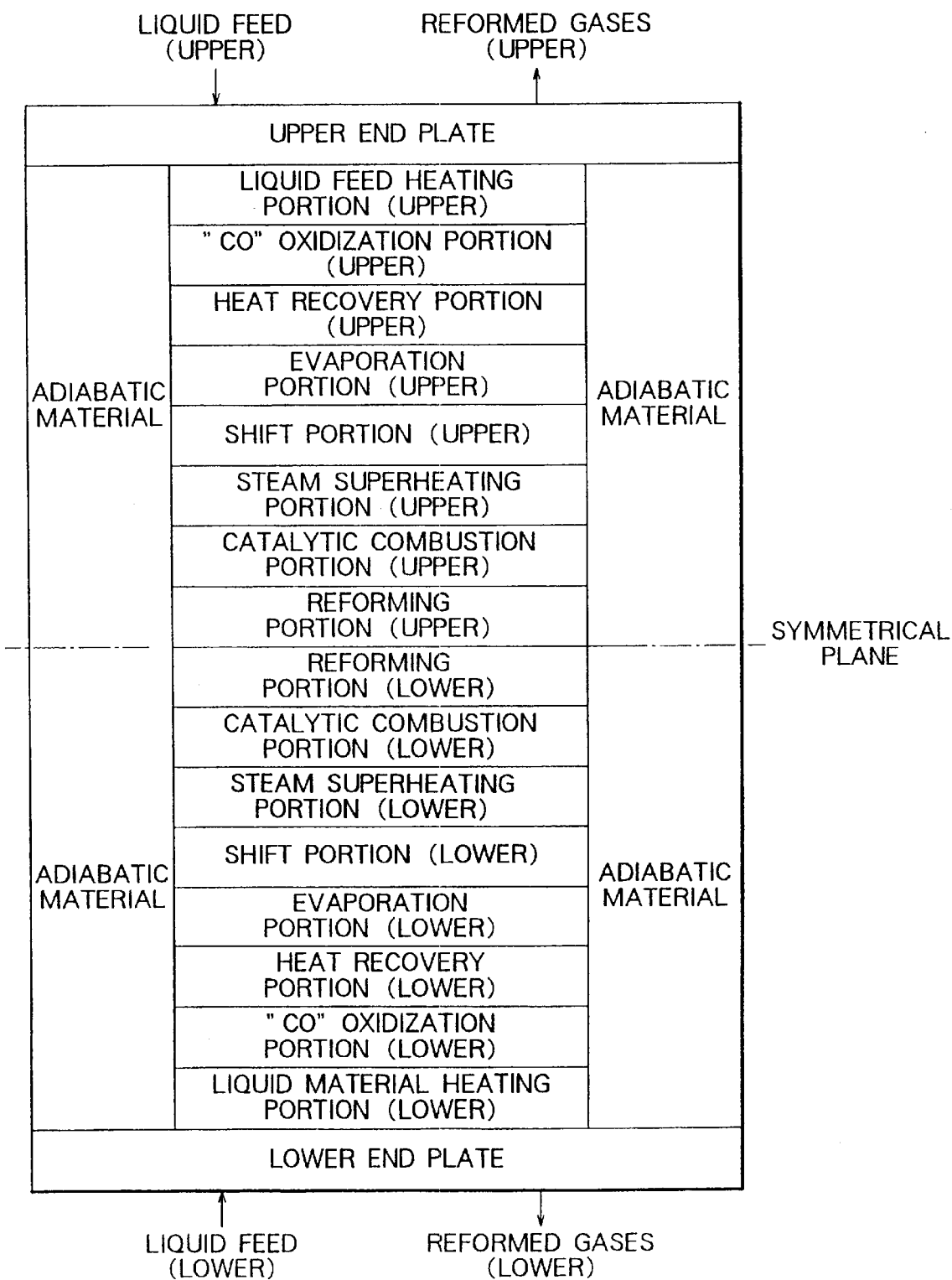
FIG. 9 is a schematic view showing the up-and-down symmetrical disposition of a fuel reforming apparatus according to a second embodiment of the present invention.

The constitution of a fuel reforming apparatus according to a second embodiment of this invention will now be described by FIG. 9. FIG. 9 is an entire constitution view schematically showing the constitution of a fuel reforming apparatus comprising two upper and lower stacked bodies which are symmetrical with respect to a symmetrical plane, each stacked body comprising flat plate elements. In the figure, adiabatic materials are provided on the side surfaces of the first and second stacked bodies forming the fuel reforming apparatus. A one-dotted chain line in FIG. 9 represents a symmetrical plane in the case where flat plate elements are symmetrically disposed.

In this fuel reforming apparatus, as shown in FIG. 9, the first stacked body is constituted by flat plate elements: an upper end plate, a liquid feed heating portion, a CO oxidization portion, a heat recovery portion, an evaporation portion, a shift reaction portion, a steam superheating portion, a catalytic combustion portion, and a reforming portion. Also, with the symmetrical plane between the first and second stacked bodies as a boundary, the second stacked body is constituted by flat plate elements: a reforming portion, a steam superheating portion, a catalytic combustion portion, a shift reaction portion, an evaporation portion, a heat recovery portion, a CO oxidization portion, a liquid feed heating portion, and a lower end plate. That is, with the symmetrical plane as a boundary, pairs of reforming portion and catalytic combustion portions are stacked at the center, and the other flat plate elements are symmetrically stacked up and down of the stacked body. Furthermore, adiabatic materials are provided on the side surfaces of the first and second stacked bodies comprising flat plate elements.

This constitution can reduce the heat loss from upper and lower surfaces and side surfaces and also can make efficiently utilize heat, which would be heat loss, as preheat for fuel and air. In this embodiment, while the supply of the liquid feed and the exhaust of the reformed gases have been performed by both end plates, they may also be collectively performed with either end plate by branching or merging the liquid feed or reformed gases from an inner manifold to flat plate elements. In FIG. 9, although the supply and exhaust for Off-gases, air, and combustion gases have not been shown, they may also be provided independently on both end plates or provided collectively on either end plate.

Third embodiment

A description will now be made of a fuel reforming apparatus according to a third embodiment of this invention. In the fuel reforming apparatus of this embodiment, turn-back passages for fluid flow are provided in the stacked direction of flat plate elements and also a plurality of flat plate elements are stacked. This structure is applicable to the heat recovery portion for combustion gases, the steam superheating portion and CO oxidization portion for methanol and water, and the reforming portion and shift reaction portion. In a method of recovering exhaust heat of combustion gases, there is a "surface division method" which divides an exhaust heat recovery portion and a catalytic combustion portion into surfaces, in addition to the "passage turn-back method" of this embodiment.

Figure 10:
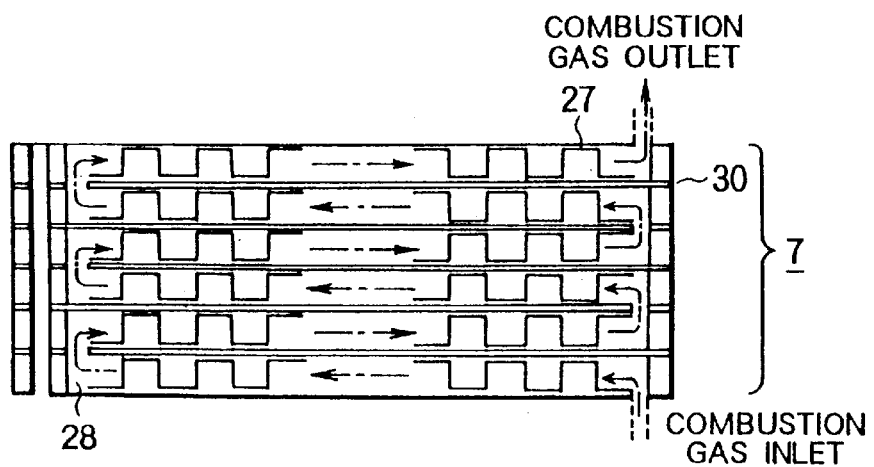
FIG. 10 is a sectional view showing the structure of a combustion gas heat recovery portion according to a third embodiment of the present invention.

The constitution of the heat recovery portion 7 of the "passage turn-back type" is shown in FIG. 10. In the figure, 27 denotes the section of a heat-transfer fin. The surface of this heat-transfer fin 27 forms combustion gas passages. 30 is a partition plate for partitioning upper and lower combustion gas passages. 28 is a combustion gas passage turn-back hole at which combustion gases flowing through a lower combustion gas passage are turned back in the stacked direction and then flows through an upper combustion gas passage. In FIG. 10, a flow of combustion gases is represented by a one-dotted chain line.

In this embodiment, heat recovery is performed by turning back a combustion gas passage in the stacked direction at the combustion gas passage turn-back hole 28 and also allowing combustion gases to flow inside the heat-transfer fin 27 provided within the turned-back combustion gas passage. The chance that combustion gases will recover heat is increased by turning back combustion gases many times in order of stacked plate elements. Furthermore, the convection heat transfer between combustion gases and the heat-transfer fin 27 is promoted by employing an offset intermittent fin (see the heat-transfer fin 27 in FIG. 4) in the configuration of the heat-transfer fin 27 so that a boundary layer formed on the heat-transfer fin surface is cut by the next offset fin.

The heat recovery portion 7 performs heat exchange between it and the lower steam superheating portion and between it and the upper evaporation portion and then supplies heat necessary for evaporation and superheating of steam. In this embodiment, while the turn-back portion for combustion gases has been constituted by 6 flat plate elements, the stacked-direction temperature distribution of the heat recovery portion adjusts the number of stacked flat plate elements and the configuration of the heat-transfer fin so that the lower temperature becomes a temperature near to a suitable steam superheating temperature and also the upper temperature becomes a temperature near to a suitable temperature for shift reaction and to an evaporation temperature.

High-temperature combustion gases flow to the heat recovery portion 7, then perform heat exchange between the combustion gases and steam comprising methanol and water, and are effectively used to evaporate liquid feed. In the structure of the heat recovery portion, heat-transfer fins 27 are provided in the interior of each flat plate element and stacked. The high-temperature exhaust heat of combustion gases is transferred to the adjacent evaporation portion or steam superheating portion through the heat-transfer fins 27.

The low-temperature combustion gases emerging from the heat recovery portion 7 pass through the manifold 22 provided in one edge of the interior of the flat plate element and are exhausted from the combustion gas exhaust tube 15 attached to the upper end plate 23 (see FIGS. 2 and 3) via the low-temperature heat recovery portion. In this embodiment, while the turn-back passages of the heat recovery portion 7 have been stacked with 6 flat plate elements, the passages do not need to be limited to 6 elements. The number of elements may also be set in correspondence with an amount of heat recovery. In addition, to effectively perform heat exchange between combustion gases and steam, flat plate elements constituting the steam superheating portion and the evaporation portion may also be alternately disposed between the flat plate elements for combustion gases.

Fourth embodiment

Figure 11:
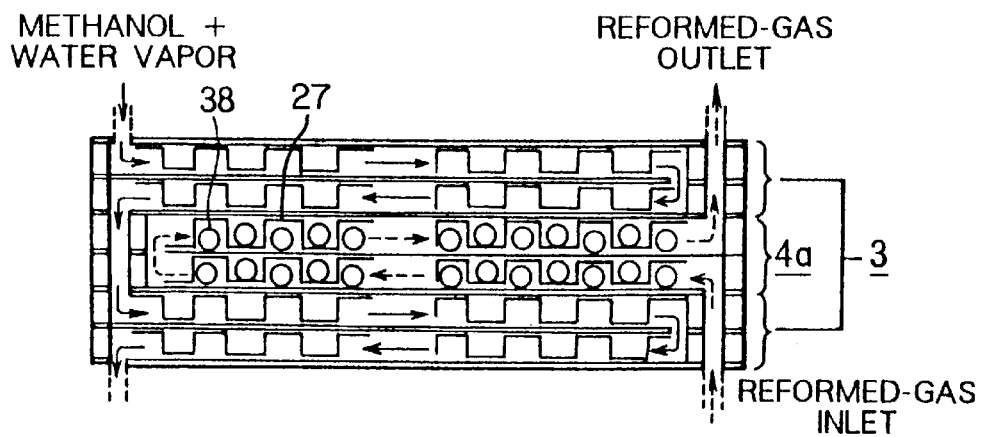
FIG. 11 is a sectional view showing the structure of a shift reaction porion according to a fourth embodiment of the present invention.

The structures of the steam superheating portion and the shift reaction portion of the "turn-back type" according to a fourth embodiment of this invention are shown in FIG. 11. In the figure, 4a is a shift reaction portion, 3 a steam superheating portion, 38 a shift catalyst, and 27 a heat-transfer fin.

In this embodiment, the reformed-gas passage of the low-temperature portion 4a is interposed between two upper and lower superheated-steam passages, thereby performing the heat exchange between methanol+water vapor and reformed gases by employing turn-back passages. The low-temperature shift reaction portion 4a is constituted by flat plate elements provided with heat-transfer fins 27 in the interior, and the inner side of the heat-transfer fin 27 is filled with a shift catalyst 38. The shift catalyst uses a Cu-Zn catalyst, a Fe2O3—Cr2O3 catalyst, or a Pd/Al2O3 catalyst, and carbon monoxide and steam in reformed gases are converted to carbon dioxide and hydrogen by shift reaction (CO+H2O→CO2+H2).

The heat generated due to the shift reaction is transferred to the upper and lower steam superheating portions 3 past the heat-transfer fins 27 and is used to superheat steam. To set the low-temperature shift reaction portion 4a to a suitable temperature, the number of stacked flat plate elements and the configuration pitch and fin thickness) of the heat-transfer fin 27 are adjusted or the material of the partition plate 30 is changed to material with a thermal conductivity different from aluminum. When the low-temperature shift reaction portion 4a cannot be set to a suitable temperature with these methods, for example, when the temperature of the low-temperature shift reaction portion 4a is too high, the upper steam superheating portion 3 is removed and the low-temperature shift reaction portion 4a is contacted directly with the evaporation portion.

In the low-temperature shift reaction porion 4a, the temperature is reduced from the inlet to the outlet so that the shift reaction advances, as the reformed gases pass through the catalytic layer. To achieve temperature distribution such as this, the flow of the reformed gases and the flow of methanol and water vapor are opposite in direction, as shown in FIG. 11. The outlet temperature of the shift reaction portion is set to a suitable temperature (200 to 250° C.) for shift reaction by performing heat exchange between the reformed gases and low-temperature (about 200° C.) steam.

Fifth embodiment

Figure 12:
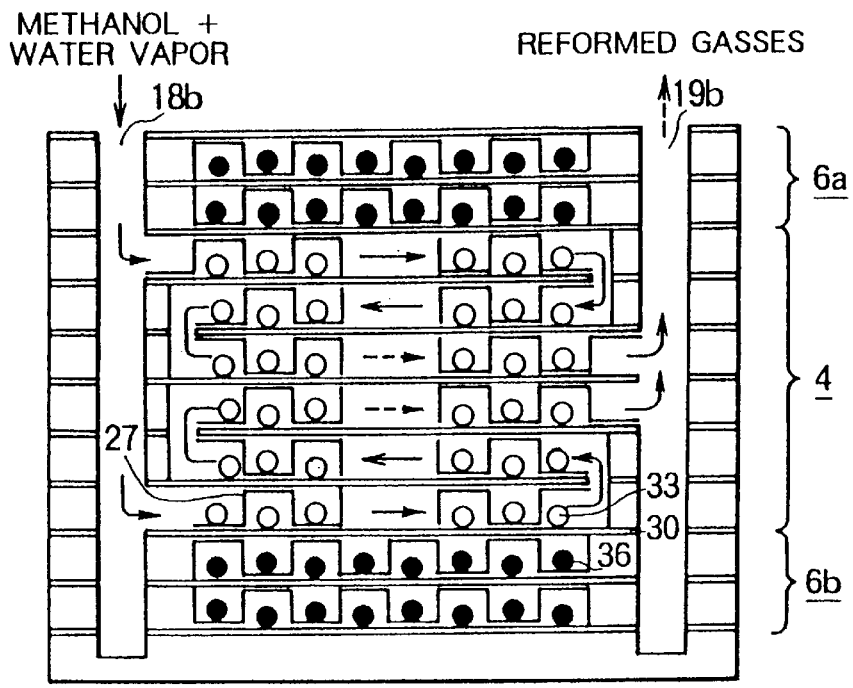
FIG. 12 is a sectional view showing the structure of a turn-back reforming portion and the flow of reformed gases according to a fifth embodiment of the present invention.

The constitution of the multilayer reforming portion of a fuel reforming apparatus according to a fifth embodiment of this invention will now be described by FIG. 12. In the figure, reference numeral 4 denotes a multilayer reforming portion including turn-back passages. This multilayer reforming portion 4, as with the multilayer reforming portion 4 shown in FIG. 6, is constituted by an upper catalytic combustion portion 6a, a lower catalytic combustion portion 6b, a steam supply manifold 18b for methanol and water, heat-transfer fins 27, a partition wall 30, reforming catalysts 33, combustion catalysts 36, and a reformed-gas outlet manifold 19b. In FIG. 12, the steam flow of methanol+water is represented by a solid line and the flow of reformed gases by a broken line.

In this embodiment, the multilayer reforming portion 4 with turn-back passages is constituted by 6 layers (upper and lower pairs) of flat plate elements, and upper and lower pairs of flat plate elements are symmetrically disposed. Steam consisting of methanol and water is supplied from the steam supply manifold 18b to the uppermost layer and the lowermost layer of the multilayer reforming portion 4, and the reformed gases are turned back in the stacked direction and flow from the two central layers of the multilayer reformation 4 to the reformed-gas outlet manifold 19b. With structure such as this, the flow of material and the flow of reformed gases become symmetrical as well. The heat generated in the combustion catalysts 36 is transferred to the reforming catalysts 33 through the heat-transfer fins 27 and the partition plates 30.

The uppermost layer and the lowermost layer of the multilayer reforming portion 4 are adjacent to the catalytic combustion portions 6a and 6b and highest in temperature among the layers of the multilayer reforming portion 4. By having many reforming reactions take place at the high-temperature uppermost and lowermost layers of the multilayer reforming portion 4, the generation of heat due to combustion of catalysts can be more effectively utilized in the absorption of heat in the reforming reaction. Additionally, by causing reformed gases to emerge from the low-temperature center portion of the multilayer reforming portion 4 away from the catalytic combustion portions 6a and 6b, the CO concentration in the reformed gases is reduced.

Sixth embodiment

Figure 13:
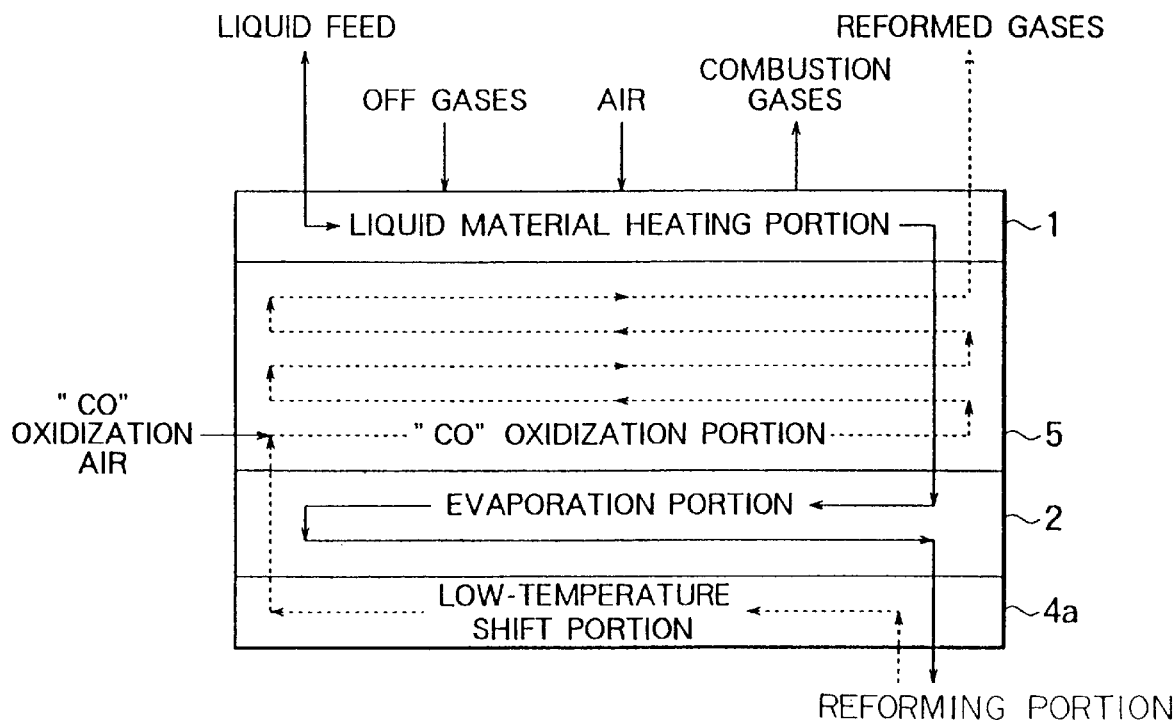
FIG. 13 is a schematic view showing the flows of liquid feed, steam, and reformed gases according to a sixth embodiment of the present invention.

The constitution of a fuel reforming apparatus according to a sixth embodiment of this invention will now be described by FIG. 13. FIG. 13 is a schematic view showing the layout of a liquid feed heating portion, a CO oxidization portion, and an evaporation portion. In the figure, 5 is a multilayer CO oxidization portion provided with turn-back passages, 2 an evaporation portion, and 1 a liquid feed heating portion. The multilayer CO oxidization portion 5 is constituted by stacking flat plate elements provided with turn-back passages for reformed gases. In FIG. 13, a solid line represents a flow of methanol and water and a broken line a flow of reformed gases. CO oxidization air is introduced into the reformed gases emerging from a shift reaction portion 4a.

For the oxidization of the CO in the reformed gases there is a suitable temperature range in correspondence with the CO concentration, and the oxidization of high-concentration carbon monoxide (CO) requires high temperatures. Also, in order to achieve a CO concentration of less than a few parts per million, low temperatures are required to suppress reverse shift reaction (H2+CO2→CO+H2O) by which the hydrogen and carbon dioxide in the reformed gases are converted to carbon monoxide and water.

Therefore, from tests made by the inventors, if the temperature distribution of the multilayer CO oxidization portion 5 is set to about 240° C. at the inlet portion which is high in CO concentration and about 110° C. at the outlet portion which is low in CO concentration, a CO concentration of less than a few parts per million can be achieved. Also, if the inlet temperature of the multilayer CO oxidization portion is set to more than 250° C., the greater part of oxygen for CO oxidization will be consumed for oxidization of hydrogen and therefore CO oxidization will not be performed.

In this embodiment, the temperature distribution of the multilayer CO oxidization portion 5 is set to a suitable temperature range for CO oxidization, by arranging the inlet portion of the multilayer CO oxidization portion 5 in proximity to the evaporation portion 2 and the outlet portion in proximity to the liquid feed heating portion 1, as shown in FIG. 13. Additionally, at the inlet portion of the multilayer CO oxidization portion 5, the generation of heat due to CO oxidization is utilized for evaporation, and the temperature rise in the inlet portion due to the generation of heat is suppressed to less than 250° C.

At the outlet portion of the multilayer CO oxidization portion 5, by the heat exchange between reformed gases and liquid feed, the reformed gases are reduced down to a temperature (about 110° C.) near to the operating temperature of a fuel cell and also the liquid feed is preheated. Thus, by positively having temperature distribution so that the inlet of the multilayer CO oxidization portion 5 is high in temperature and also the outlet is low in temperature, at the high-temperature inlet a reaction rate is increased, thereby promoting oxidization of high-concentration carbon monoxide, and at the low-temperature outlet the generation of carbon monoxide due to a reverse shift reaction is suppressed, thereby reducing the concentration of the carbon monoxide in the reformed gases. Thus, the multilayer CO oxidization portion 5 with the temperature distribution is capable of even more effectively reducing CO concentration compared with isothermal CO oxidizing reactors.

Figure 14:
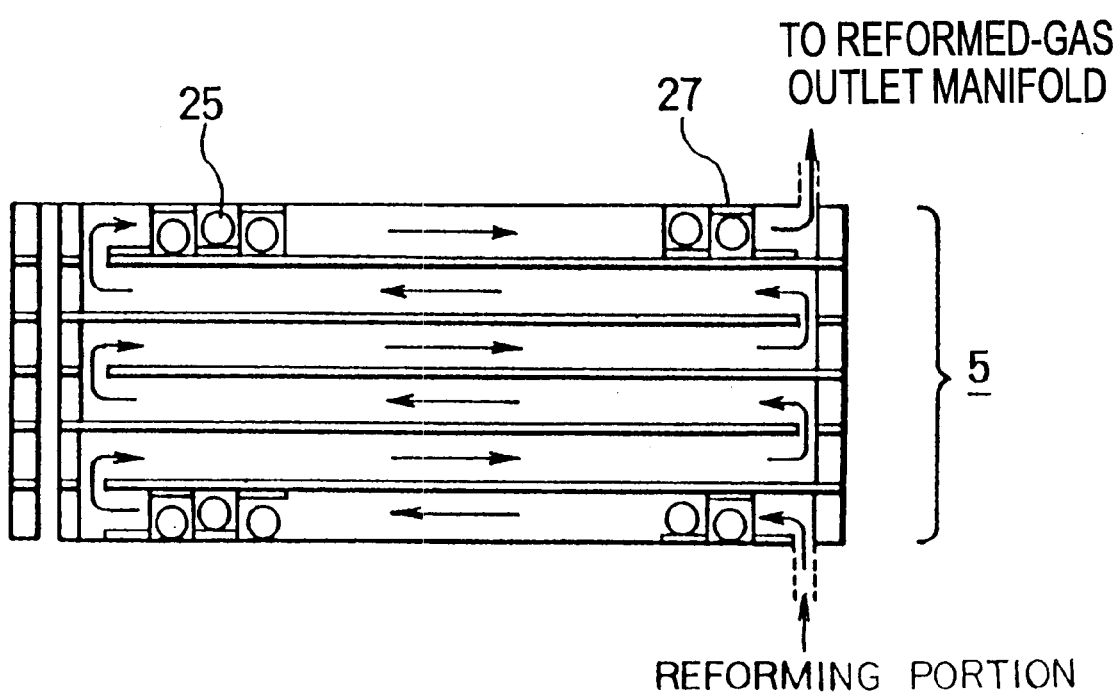
FIG. 14 is a sectional view showing the structure of a CO oxidization portion according to the sixth embodiment of the present invention.

The sectional structure of the multilayer CO oxidization portion 5 with turn-back passages in this embodiment is shown in FIG. 14. In the figure, 25 is a CO oxidization catalyst and 27 a heat-transfer fin. In FIG. 14, an arrow of solid line represents a flow of reformed gases. In the figure, to illustrate the flow of reformed gases, although some of the oxidization catalysts and heat-transfer fins have only been shown and other portions have been omitted, the CO oxidization catalysts 25 and the heat-transfer fins 27 are provided on the entire surface of the effective reaction portion and on all flat plate elements in the stacked direction.

The CO oxidization catalyst can employ catalysts, such as platinum in an alumina carrier, ruthenium, palladium, and rhodium. As shown in FIG. 14, the multilayer CO oxidization portion in this embodiment is constituted by stacking a plurality of turn-back passages, which have heat-transfer fins 27 in the stacked direction. The inner side of the heat-transfer fin 27 is filled with a CO oxidization catalyst 25. Therefore, the generation of heat due to CO oxidization is transferred to the adjacent evaporation plate past the heat-transfer fins 27 and is utilized as heat necessary for evaporation. Additionally, by adjusting the number of stacked flat plate elements to obtain a suitable temperature distribution for CO oxidization, the CO concentration at the outlet can be reduced down to an allowable level of less than a few parts per million.

Seventh embodiment

Figure 15:
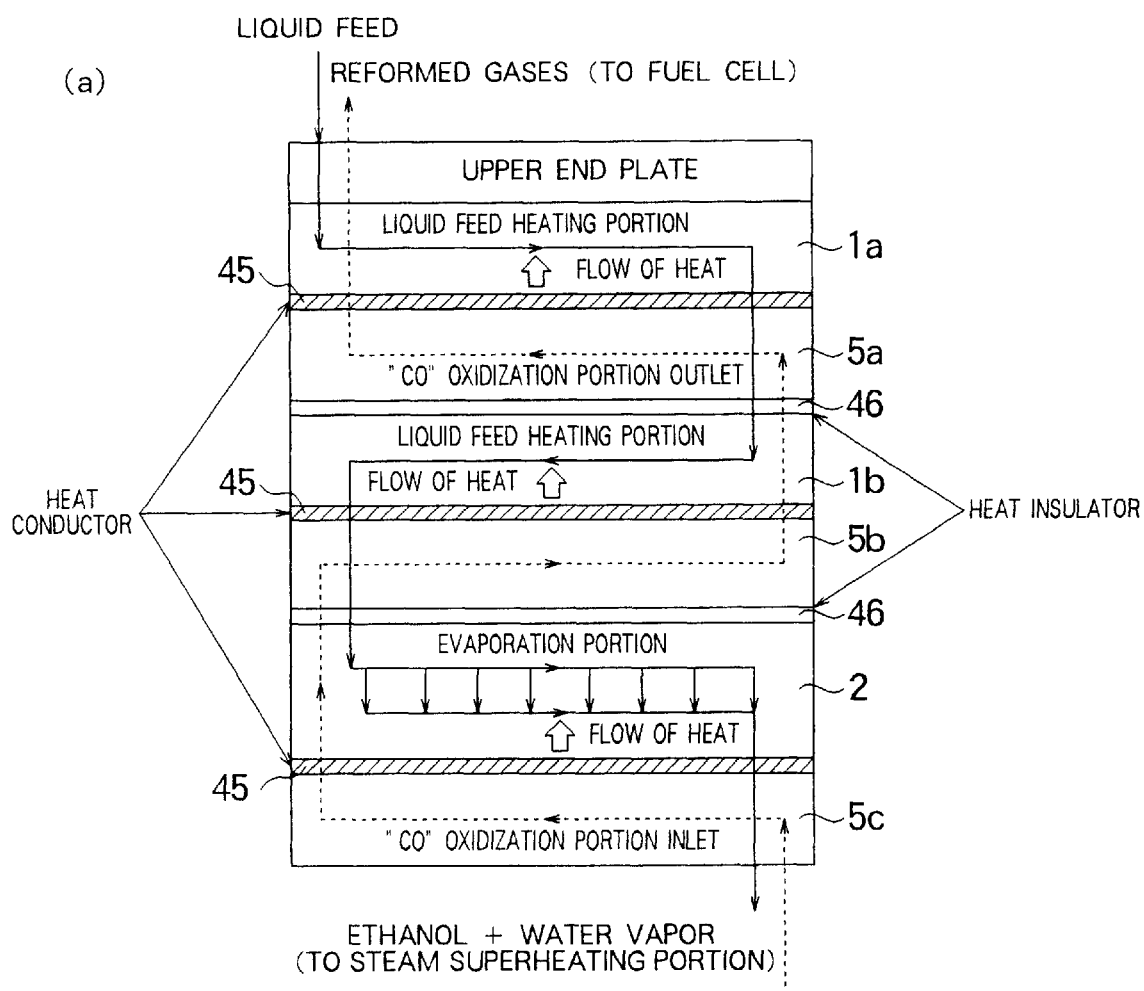
FIG. 15 is a schematic view showing the layout of the heat conductor and heat insulator of a CO oxidization portion and the flow of heat according to a seventh embodiment of the present invention.
Figure 15:
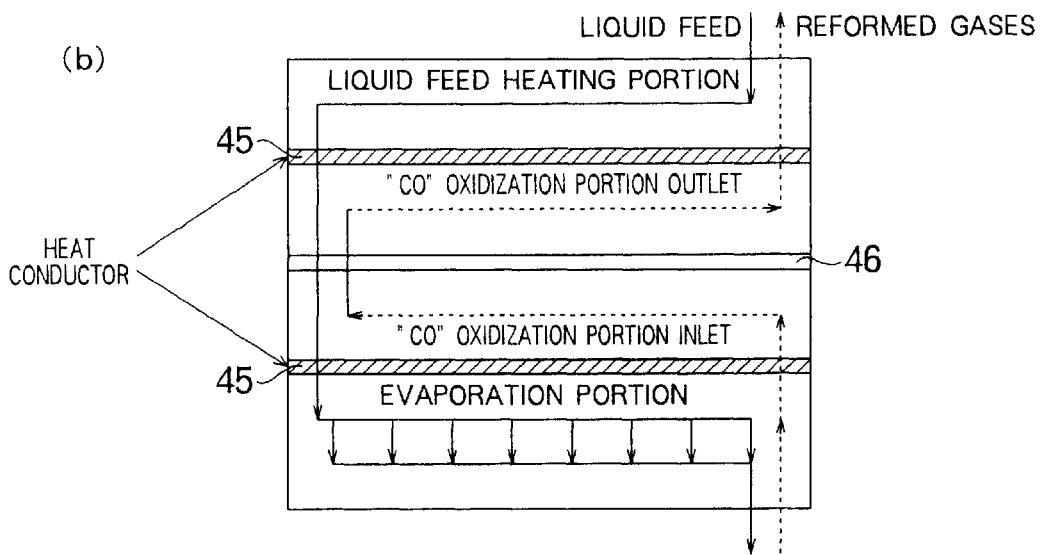

The CO oxidization portion of another constitution of a fuel reforming apparatus according to a seventh embodiment of this invention will now be described by FIG. 15(a). FIG. 15(a) is a schematic view showing the layout of a liquid feed heating portion, a CO oxidization portion, heat conductors, heat insulators, and an evaporation portion. In the figure, 5a, 5b, and 5c are CO oxidization portions. 2 is an evaporation portion, 1a and 1b are liquid feed heating portions, and 45 is a heat conductor (shown by hatching). In FIG. 15(a), a solid line represents a flow of methanol and water which are liquid feed, and a broken line represents a flow of reformed gases.

In this embodiment, to have a smooth temperature distribution in the stacked direction of the CO oxidization portions 5a, 5b, and 5c and in the flow direction, the liquid feed heating portions 1a and 1b and the evaporation portion 2 are arranged between the multilayered CO oxidization portions 5a, 5b, and 5c, and also the flow of reformed gasses and the flow of liquid feed and steam are made opposite in direction at the boundary surface which promotes heat exchange.

At the outlet of the CO oxidization portion 5a, it is necessary that the reformed gases perform heat exchange between the gases and the liquid feed and are reduced down to a temperature near to the operating temperature of a fuel cell. For this reason, the heat conductor 45 is provided on the boundary between the liquid feed heating portion 1a and the CO oxidization portion 5a which is desired to promote heat exchange. On the other hand, to avoid the heat exchange between the liquid feed heating portion 1b which has been raised to a high temperature through heat exchange and the CO oxidization portion 5a, the heat insulator 46 is provided on the boundary between the liquid feed heating portion 1b and the CO oxidization portion 5a.

To promote the heat exchange between the preheated liquid feed heating portion 1b and the CO oxidization portion 5b located just under the portion 1b, the heat conductor 45 is provided on the boundary. Thus, by alternately disposing the heat insulator 46 and the heat conductor 45 at the boundaries between the CO oxidization portion 5a and the liquid feed heating portion 1a, heat is transferred from above to under with better efficiency, thereby obtaining a smooth temperature distribution in the stacked direction of the CO oxidization portion 5.

Furthermore, to perform efficient heat exchange in the flow direction as well, the reformed gases and the liquid feed and steam are caused to flow in opposite directions at the boundary (heat conductor) where it is desired to promote heat exchange. On the other hand, at the boundary (heat insulator) where it is desired to avoid heat exchange, the reformed gases are caused to flow in parallel to the flow of the liquid feed and steam. Note that the heat conductor 45 provided on the boundary surface can employ partition plates with better thermal conductivity, such as an aluminum partition plate, an aluminum-alloy partition plate, and a copper partition plate. The heat insulator 46 provided on the boundary surface can employ a Teflon sheet, a stainless partition plate, or a metal member coated on the surface with an insulating resin.

FIG. 15(b) shows the rough constitution of the CO oxidization portion. Without having a complicated constitution such as that shown in FIG. 15(a) and with the simplified constitution where a CO oxidization portion is constituted by two layers of turn-back passages and also a liquid feed heating portion and an evaporation portion are provided up and down, by providing the heat conductor 45 and the heat insulator 46 at boundary portions, a smooth temperature distribution can be obtained in the stacked direction of the CO oxidization portion.

Eighth embodiment

Figure 16:
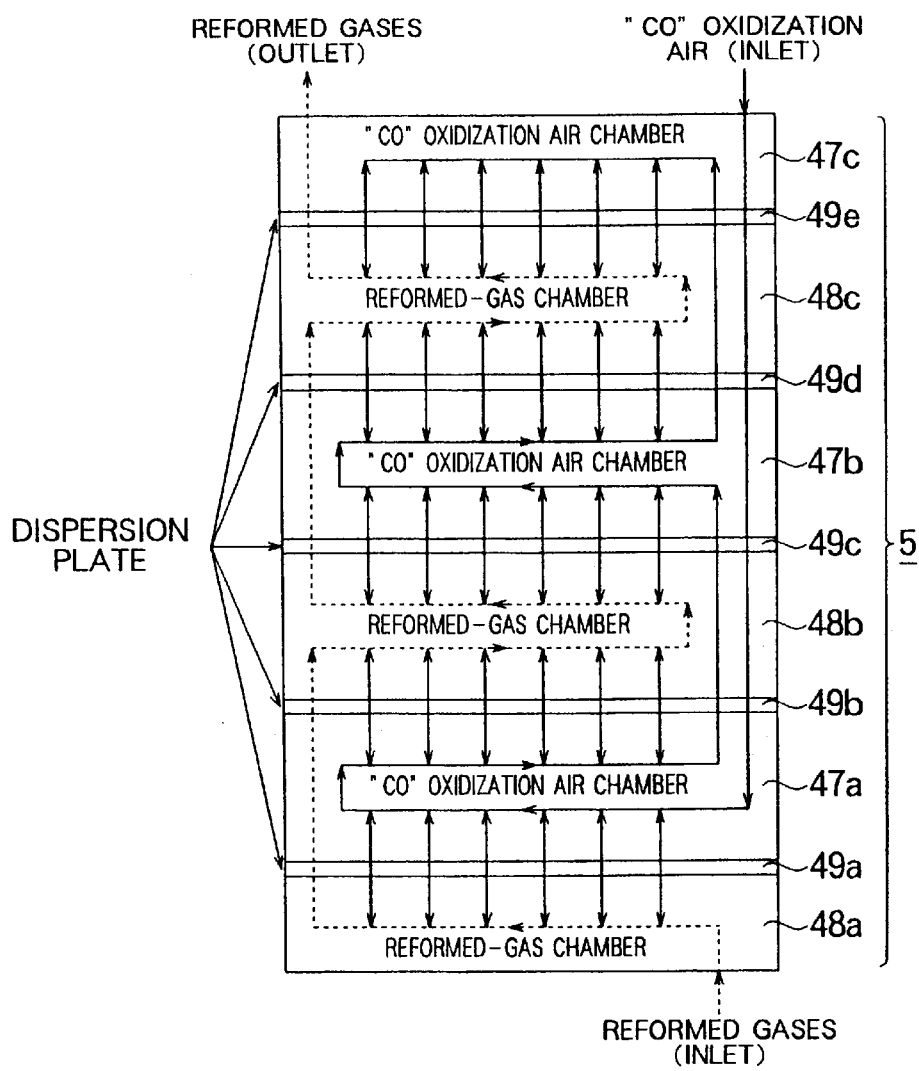
FIG. 16 is a schematic view showing the air introduction method of a CO oxidization portion and the flows of CO oxidization air and reformed gases according to an eighth embodiment of the present invention.

A description will now be made of the air introduction method of the CO oxidization portion 5 of a fuel reforming apparatus according to an eighth embodiment of this invention. FIG. 16 is a schematic view showing the constitution of the CO oxidization portion provided with CO oxidization air dispersion plates. In the figure, 48a through 48c are reformed gas chambers, 47a through 47c are CO oxidization air chambers, and 49 is a dispersion plate. In FIG. 16, a solid line represents a flow of CO oxidization air and a broken line a flow of reformed gases.

The CO oxidization portion 5 in this embodiment is constituted by stacking reformed-gas chambers 48a through 48c through which reformed gases flow mainly, CO oxidization air chambers 47a through 47c through which CO oxidization air flows mainly, and dispersion plates 49a through 49c by which reformed gases and air are mutually diffused through dispersion holes. Reformed gases are introduced into the reformed-gas chamber 48a of the CO oxidization portion 5, and air is introduced into the CO oxidization air chamber 47a.

While reformed gases and air are being diffusely mixed with each other through the dispersion plate 49a, they are dispersedly supplied to the surface of the CO oxidization portion, and the CO in the reformed gases is oxidized by CO oxidization catalysts. The reformed gases flow in parallel to the flow of the CO oxidization air, and the CO oxidization air is supplied to the flow of the reformed gases, thereby making oxygen concentration higher at the inlet of the CO oxidization portion which is high in CO concentration. The reformed gases flow upward at the manifold located at the end of the reformed-gas chamber 48a consisting of a flat plate element. At the inlet of the reformed-gas chamber 48b, the reformed gases are inverted and flow in the opposite direction to the reformed-gas chamber 48a.

Air is inverted at the end of the flat plate element 47a, then is turned back upward, and is mutually diffusely mixed with the reformed gases through the dispersion plate 49b. Thus, since CO oxidization air turns back at the end of the flat plate element and is mutually diffusely mixed with the reformed gases at the adjacent surface through the dispersion plate, an oxygen concentration distribution which becomes high in concentration at the inlet and low in concentration at the outlet is obtained in the flow direction of the reformed gases, thereby effectively oxidizing the CO that is contained in the reformed gases.

While this embodiment has been described with respect to a method of dispersedly supplying CO oxidization air into reformed gases, a description will hereinafter be made of the relationship between the reformed gases and the temperature distribution of the CO oxidization portion 5. As described in the seventh embodiment, the temperature distribution of the CO oxidization portion 5 is preferred to be high in temperature at the inlet and low in temperature at the outlet.

If all air is premixed with the reformed gases before the reformed gases enter the CO oxidization portion 5 and if the dispersed supply of air at the CO oxidization portion 5 is stopped, then the greater part of oxygen will be consumed at the inlet portion which is high in temperature and required oxygen for CO oxidization will be insufficient at the outlet portion, and consequently, the low concentration of the carbon monoxide (CO) in the reformed gases cannot be achieved. The oxygen that is consumed at the high-temperature inlet portion is more consumed in hydrogen oxidization than in carbon monoxide (CO) oxidization and therefore insufficient oxygen is causative of hydrogen loss.

Therefore, in the CO oxidization portion 5 having temperature distribution, there is a need to disperse CO oxidization air more than that in isothermal reactors and to reliably supply CO oxidization air (oxygen) to the low-temperature outlet portion as well. In the CO oxidization air amount distribution in a direction of flow, there is, for example, a method which supplies with a constant air ratio an air amount in accordance with a reaction rate corresponding to temperature by the temperature dependency of the reaction rate (Arrhenius' activation energy).

Figure 17:
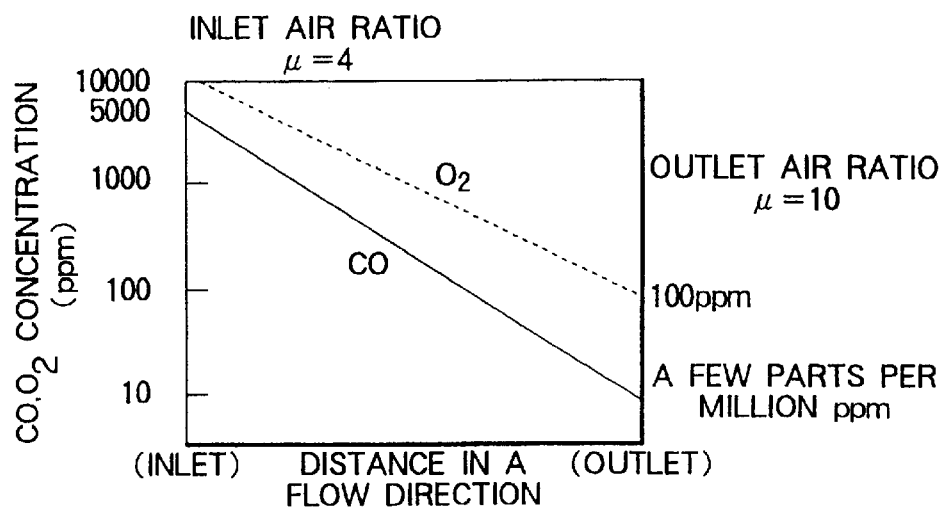
FIG. 17 is a diagram showing the CO concentration distribution and the oxygen concentration distribution of the CO oxidization portion in a direction of flow according to the eighth embodiment of the present invention.

Alternatively, there is a method which sets a ratio of air to CO concentration so that the ratio is higher at an outlet than at an inlet, in order to reliably supply oxygen onto the surface of a catalyst at a low-temperature outlet portion. For example, as shown in FIG. 17, there is another method which sets an oxygen concentration of 10,000 ppm relative to a CO concentration of 5,000 ppm at the inlet of the CO oxidization portion (air ratio $\mu=4$) and sets an oxygen concentration of 100 ppm relative to a CO concentration of a few parts per million near the outlet of the CO oxidization portion (air ratio $\mu=10$ or more).

The set flow-direction air amount distribution can be adjusted relatively easily by varying the hole diameter of the dispersion holes provided in the dispersion plate. The hole diameters of the dispersion holes are given distribution so that the diameters are reduced from the inlet of each of the CO oxidization portions of the dispersion plates 49a through 49e to the outlet. The surface disposition of the dispersion holes is one where dispersion holes are not closed by CO oxidization catalysts, as shown in the hole pattern of the dispersion plate of the catalytic combustion portion of the first embodiment (see FIG. 8).

Thus, if this embodiment is applied to the air introduction portion of the CO oxidization portion, CO oxidization air can be dispersedly supplied with reliability and also a suitable air ratio along the CO concentration in a direction of flow can be arbitrarily set by adjustment of dispersion holes, with simple structure compared with the conventional secondary air dispersion method proposed by B.P.S. incorporation in Japanese Patent Laid-Open No. 7-502205 and yet without complicated control of an amount of flow.

Ninth embodiment

Figure 18:
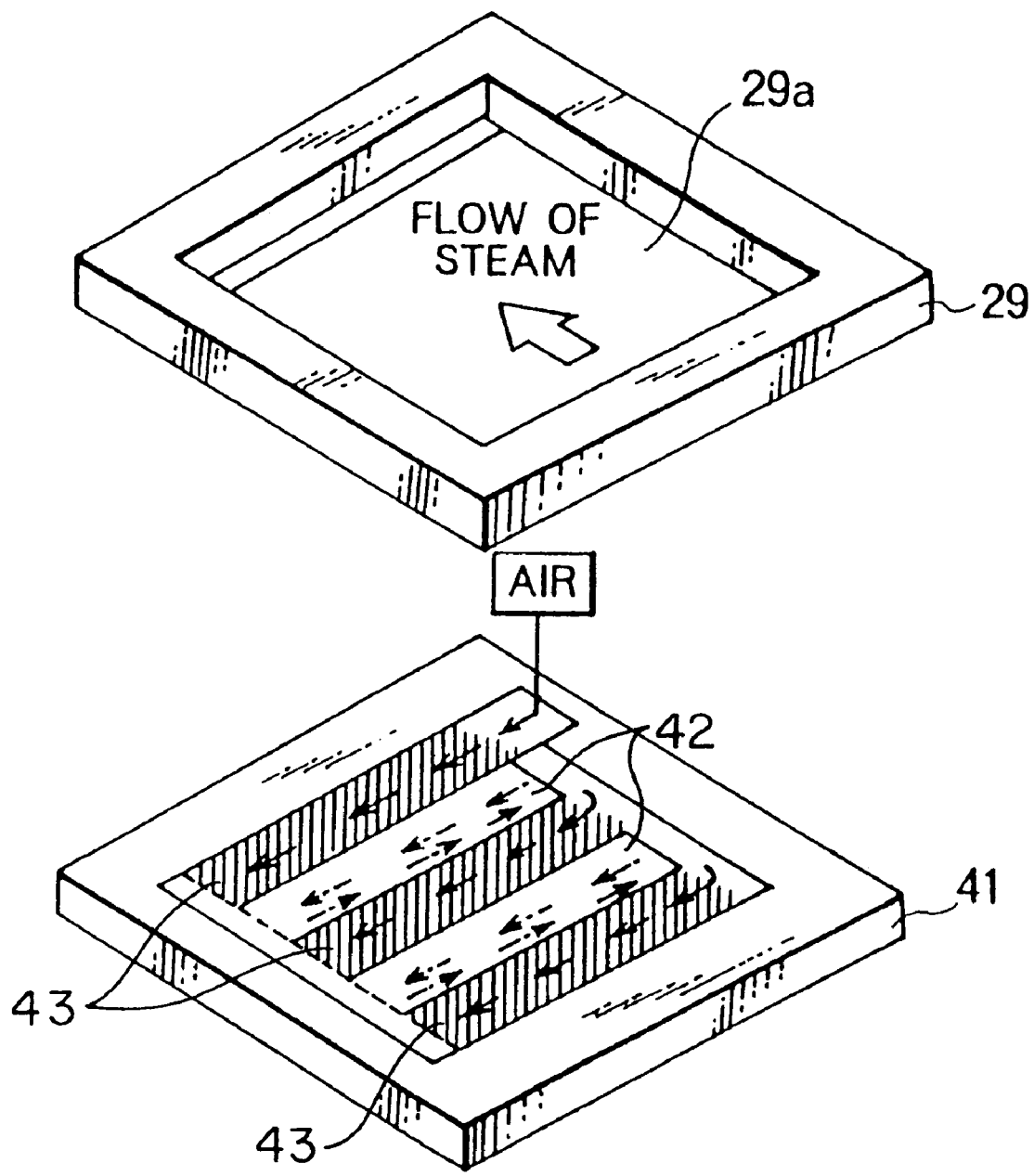
FIG. 18 is a perspective view showing the structures of a surface-division heat recovery portion and an evaporation portion and the flows of air, Off-gases, and combustion gases according to a ninth embodiment of the present invention.

The structures of the evaporation portion and the surface-division heat recovery portion of a fuel reforming apparatus according to a ninth embodiment of this invention will now be described by FIG. 18. FIG. 18 is a perspective view schematically showing the structure of the surface-division heat recovery portion dividing the surface of a heat recovery portion into an evaporation catalytic combustion portion and a combustion gas heat recovery portion and also showing the structure of an evaporation portion. In the figure, 41 is a surface-division heat recovery portion, 42 a combustion gas heat recovery portion, 43 an evaporation catalytic combustion portion, 29 an evaporation portion, and 29a an evaporation surface.

In FIG. 18, an arrow of solid line in the interior of the surface-division heat recovery portion represents a flow of air that is supplied to a catalytic combustion portion, and an arrow of broken line represents a flow of cell-Off-gases. An arrow of one-dotted chain line represents a flow of combustion gases, and along this arrow, the combustion gases generated in a catalytic combustion portion on an upstream side flow. Also, a flow of steam is represented by a large arrow on the surface of the evaporation surface 29a of the evaporation portion.

The surface-division heat recovery portion 41 in this embodiment, as shown in FIG. 18, is divided within the surface into five parts. The ⅗ within the surface is assigned to the evaporation catalytic combustion portion 43, and the remaining ⅖ within the surface to the combustion gas heat recovery portion 42. The evaporation catalytic combustion portion 43 and the combustion gas heat recovery portion 42 are constituted by flat plate elements provided with heat-transfer fins in the interior. A seal portion is provided between the divided evaporation catalytic combustion portion 43 and combustion gas heat recovery portion 42, and respective combustion gases are merged at an outlet manifold.

The combustion gases in the evaporation catalytic combustion portion flow through the combustion gas heat recovery portion 42, thereby recovering exhaust heat. Also, the merged combustion gases flow through another heat recovery portion located downstream of this, and low-temperature exhaust heat is recovered there. On the other hand, liquid feed is supplied to the evaporation portion and evaporated on the evaporation surface. For evaporation of liquid feed, it is known that a temperature suitable for evaporation varies with the kind of liquid (water, methanol, other alcohols, and alcoholic water solution).

The surface-division heat recovery portion 41 in this embodiment, therefore, can set the area ratio of the evaporation catalytic combustion portion 43 and the combustion gas heat recovery portion 42 in correspondence with the kind of liquid feed so that evaporation temperature becomes a suitable temperature. In this embodiment, while a surface has been into five parts and the area ratio of the evaporation catalytic combustion portion 43 has been ⅗, it will suffice if in low-evaporation-temperature liquid the area rate of the evaporation catalytic combustion portion 43 is reduced and in high-evaporation-temperature liquid the area rate of the evaporation catalytic combustion portion 43 is increased.

Additionally, for the positional relationship of the steam flow in the evaporation portion to the evaporation catalytic combustion portion 43 and combustion gas heat recovery portion 42 of the surface-division heat recovery portion 41, as shown in FIG. 18, the evaporation catalytic combustion portions 43 and the combustion gas heat recovery portions 42 are disposed along the steam flow so that they appear alternately on the surface. With this disposition, the liquid drops, which do not sufficiently evaporate on the evaporation surface of the combustion gas heat recovery portion 42 by heat recovery alone, move onto the evaporation surface of the evaporation catalytic combustion portion 43 along the steam flow, and reliable evaporation is performed by combustion heat.

Tenth embodiment

The structures of the evaporation portion, the surface-division heat recovery portion, and the CO oxidization portion of a fuel reforming apparatus according to a tenth embodiment of this invention will now be described by FIG. 19. In this embodiment, liquid feed comprises methanol, and the evaporation portion has two-stage constitution so that methanol and water can be separately evaporated. FIG. 19 is a schematic view showing constitution where surface-division heat recovery portions are provided just under two stages of evaporation portions (liquid feed evaporation portion and water evaporation portion) and also three stages of CO oxidization portions are provided between two stages of evaporation portions and on both sides of each evaporation portion. In the figure, 2a is a methanol (liquid fuel) evaporation portion and 41a is a second stage surface-division heat recovery portion provided just under the methanol evaporation portion 2a. 2b is a water evaporation portion and 41b is a first stage surface-division heat recovery portion provided just under the water evaporation portion 2b.

Figure 19A:
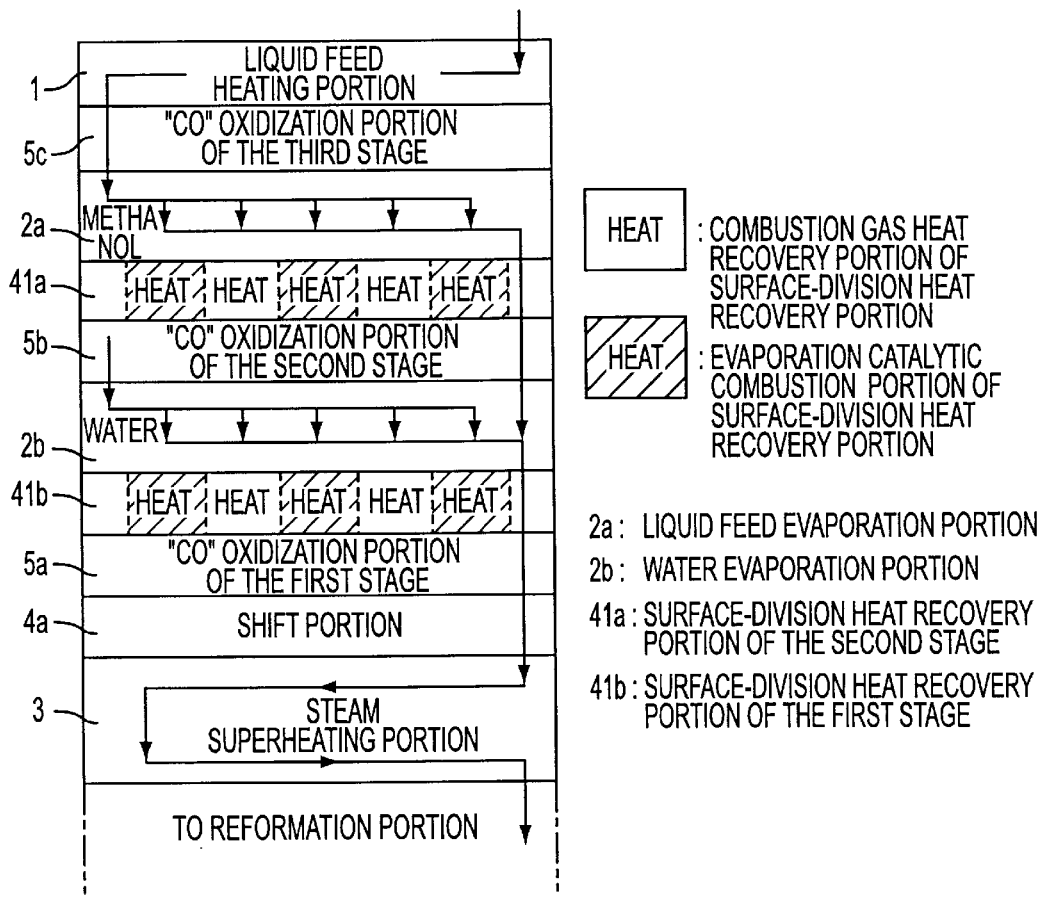
FIG. 19A is a schematic view showing the layout of a two-stage evaporation portion.

FIG. 19A also shows the layout of other adjacent flat plate elements. In the stacked order of these flat plate elements, 1 is a liquid feed heating portion, 5c a CO oxidization portion of the third stage, 5b a CO oxidization portion of the second stage, 5a a CO oxidization portion of the first stage, 4a a shift reaction porion, 3 a steam superheating portion. The CO oxidization portion of the second stage, 5b, is stacked between the methanol (liquid fuel) evaporation portion 2a and the water evaporation portion 2b. The CO oxidization portion of the third stage, 5c, is stacked above the methanol (liquid feed) evaporation portion 2a. The CO oxidization portion of the first stage, 5a, is stacked below the water evaporation portion 2b through the first stage surface-division heat recovery portion 41b.

A description will hereinafter be made of the operation of this embodiment. Methanol is supplied to the liquid feed heating portion 1 separately from water, and after preheating, methanol is introduced into the methanol evaporation portion 2a. Then, the liquid methanol is dispersedly supplied within the flat plate of the methanol evaporation portion 2a and dropped, thereby performing even evaporation within the surface. Although the vaporization temperature of methanol is 65° C., it has been found that a temperature of 100° C. is required in order to complete evaporation of methanol in a short time, as a result of the measurements in which the inventors have dropped a liquid drop of methanol onto the evaporation surface and measured the time it takes the liquid drop to evaporate and disappear.

To set the temperature of the methanol evaporation portion 2a to a suitable temperature for evaporation, a flat plate element having a function of supplying heat necessary for evaporation and also setting temperature necessary for evaporation becomes necessary. In this embodiment, an optimum methanol evaporation temperature is set, by providing the second stage surface-division heat recovery portion 41a described in the ninth embodiment just under the methanol evaporation portion 2a and by adjusting the area ratio of the evaporation catalytic combustion portion and the combustion gas heat recovery portion. In FIG. 19A, the surface is divided into 5 parts, and the evaporation catalytic combustion portion and the combustion gas heat recovery portion are distributed with a rate of 2:3.

Additionally, within the surface, the combustion gas heat recovery portions and the evaporation catalytic combustion portions are alternately disposed so that methanol liquid drops, which do not sufficiently evaporate on the evaporation surface of the combustion gas heat recovery portion, move onto the evaporation surface of the evaporation catalytic combustion portion 43 along the steam flow and that reliable evaporation is performed. The evaporated methanol passes through a steam manifold provided on the end of the flat plate and flows to the steam superheating portion 3. In this embodiment, water necessary for methanol steam reforming is supplied to the water evaporation portion 2b separately from methanol.

In methanol reformation systems associated with fuel cells, there is no need to supply water from the outside of the system, because water is generated in the interior of a fuel cell. By storing only methanol in a tank as liquid fuel, the capacity of the tank can be reduced. The water generated in a fuel cell has been preheated to near the operating temperature (80°) of the cell and therefore water, as it is, is supplied to the water evaporation portion 2b, and evaporation of water is performed.

Although the vaporization temperature of water is 100° C., a temperature of 180° C. or more is required from the measurement of evaporation time made by the inventors. To set the temperature of the water evaporation portion 2b to a temperature suitable for evaporation of water, the first stage surface-division heat recovery portion 41b is provided just under the water evaporation portion 2b, as with the methanol evaporation portion. In FIG. 19A, the area rate of the evaporation catalytic combustion portion and the combustion gas heat recovery portion is distributed to 3:2, the area rate of the evaporation catalytic combustion portion is increased compared with the second stage surface-division heat recovery portion 41a, and the evaporation temperature of water is set to 180° C.

The number of divisions and the area rate of the evaporation catalytic combustion portion and the combustion gas heat recovery portion are not limited to this embodiment but they may also be varied so that stable evaporation is obtained. In the in-surface disposition of the surface-division heat recovery portion, the evaporation catalytic combustion portion and the combustion gas heat recovery portion are alternately disposed within the surface, and the evaporation surfaces of the combustion gas heat recovery portion and the evaporation catalytic combustion portion alternately appear along the flow of steam, thereby reliably evaporating the remaining water drop. The evaporated steam is mixed with methanol vapor at the steam manifold provided in the end of the flat plate element and is guided to the steam superheating portion 3.

The CO oxidization portions 5a through 5c in this embodiment have three-stage constitution as shown in FIG. 19A and are provided between two stages of evaporation portions 2a and 2b and on both sides of each evaporation portion. The temperature distribution in the stacked direction is shown beside a constitution view of FIG. 19A. The temperature of the shift reaction portion 4a is set to 250° C. by the heat exchange between it and the steam superheating portion 3. By employing the surface-division heat recovery portions 41b and 41a, the temperature of the water evaporation portion is set to 180° C. and the temperature of the methanol evaporation portion to 100° C.

Figure 19B:
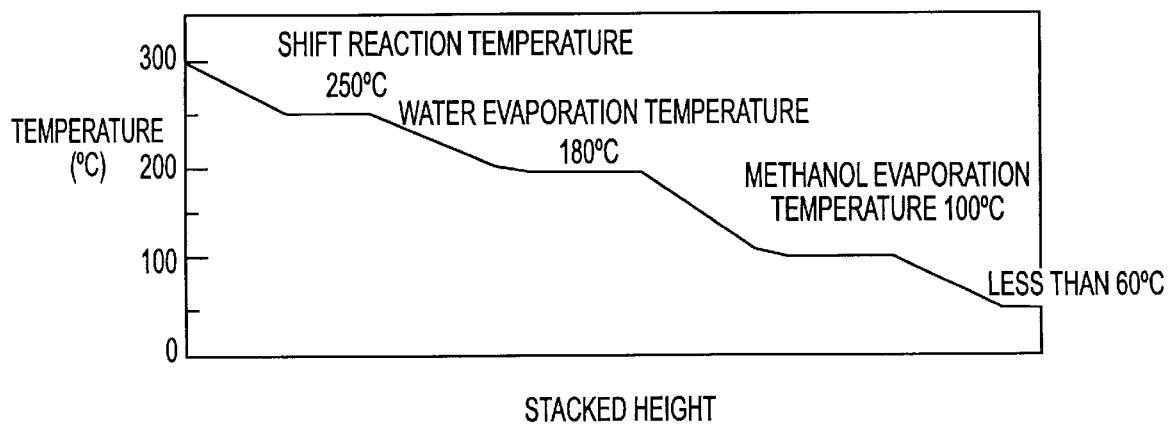
FIG. 19B shows a three-stage CO oxidization portion and the stacked-direction temperature distribution according to a tenth embodiment of the present invention.
Figure 20:
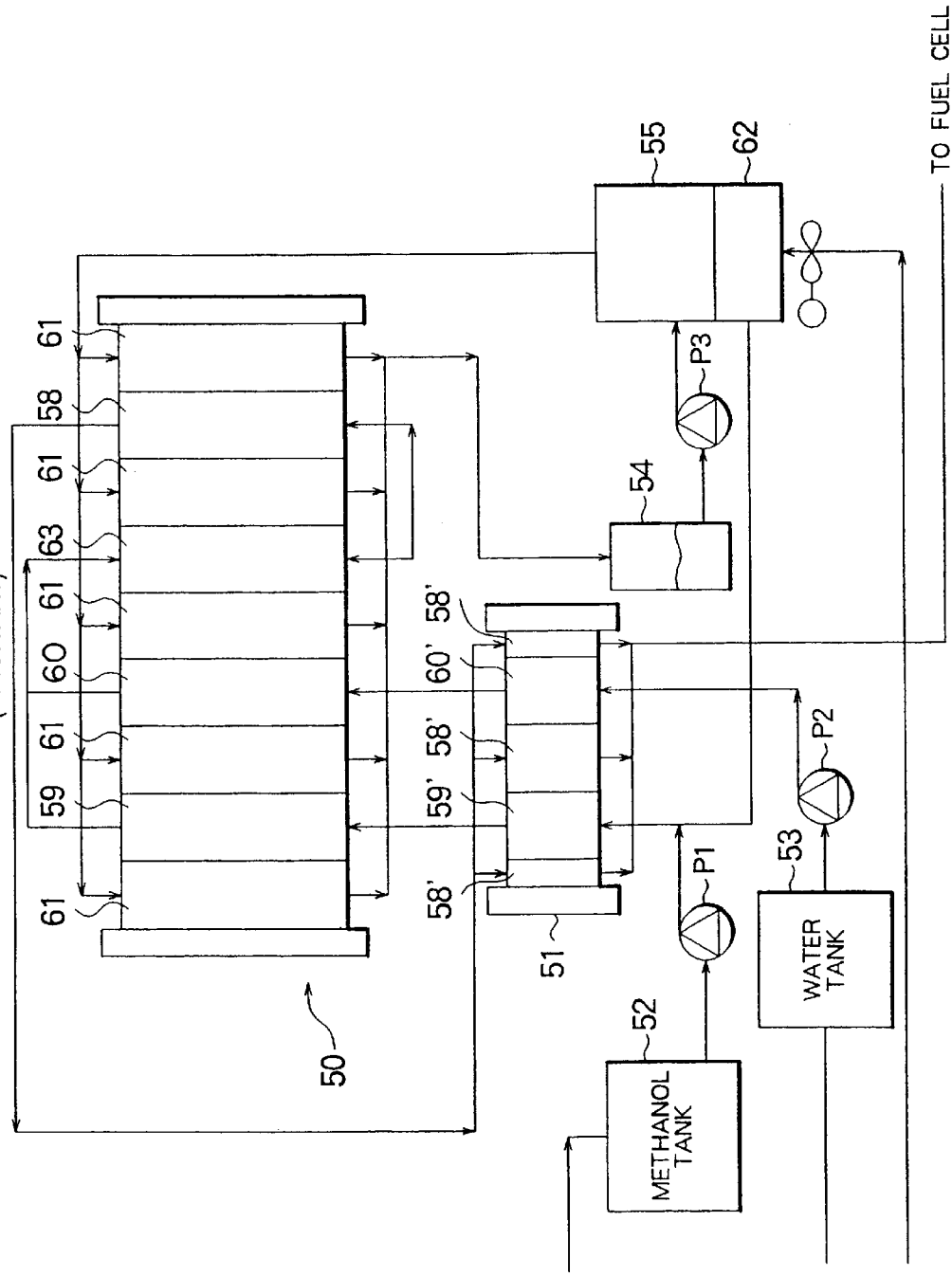
FIG. 20 is a schematic system view showing a conventional isothermal reactor module and heat recovery module.
Figure 21:
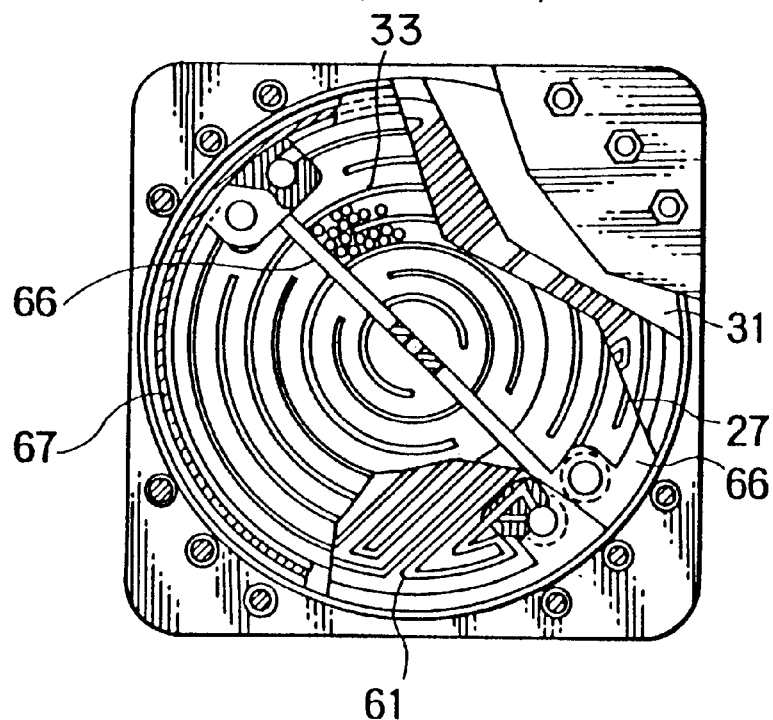
FIG. 21 is a sectional view of the conventional isothermal reactor module.
Figure 22:
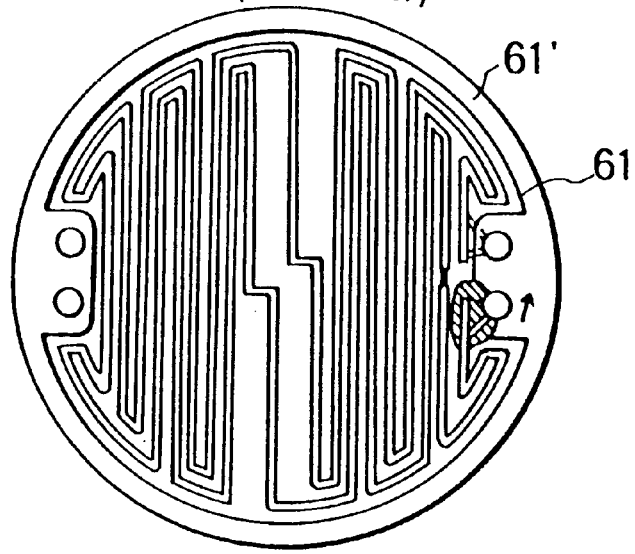
FIG. 22 is a sectional view of the heat-transfer fluid passage of the conventional isothermal reactor module.
Figure 23:
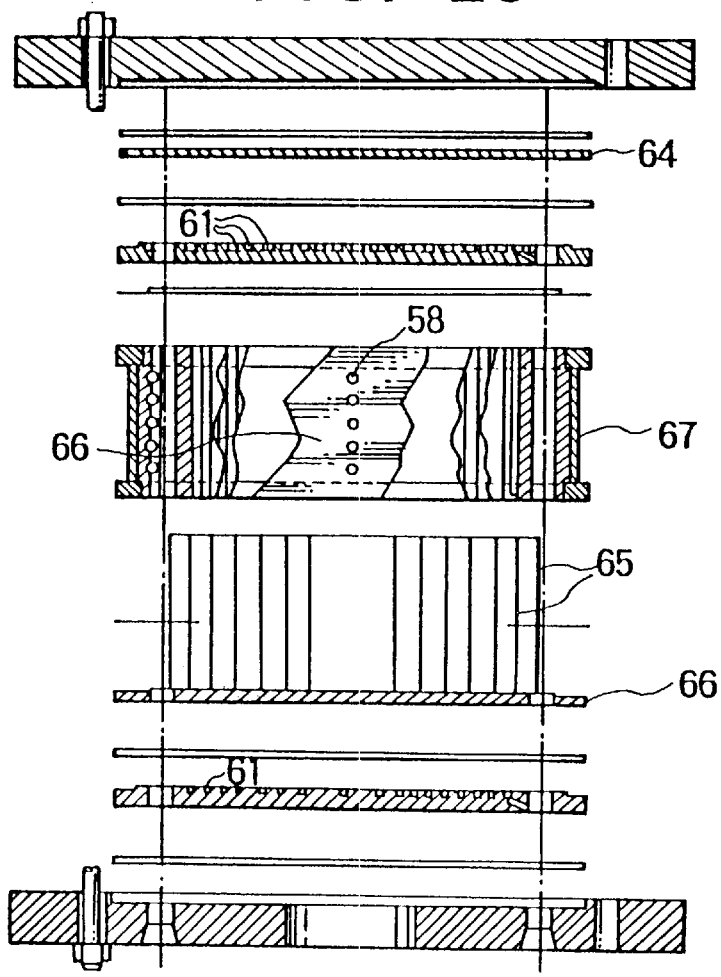
FIG. 23 is a diagram of the conventional isothermal reactor module in a stacked direction.
Figure 24:
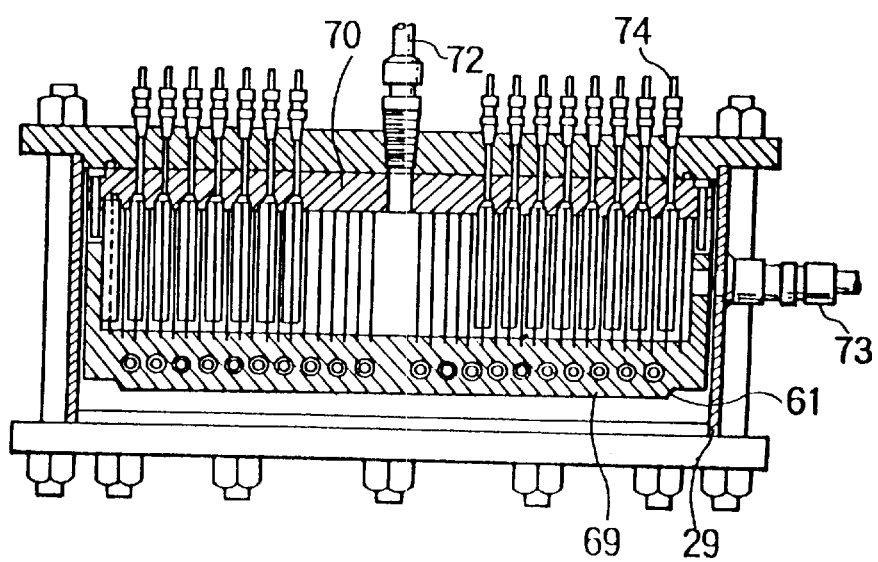
FIG. 24 is a side sectional view of a conventional selective oxidizing reactor in an assembled state.
Figure 25:
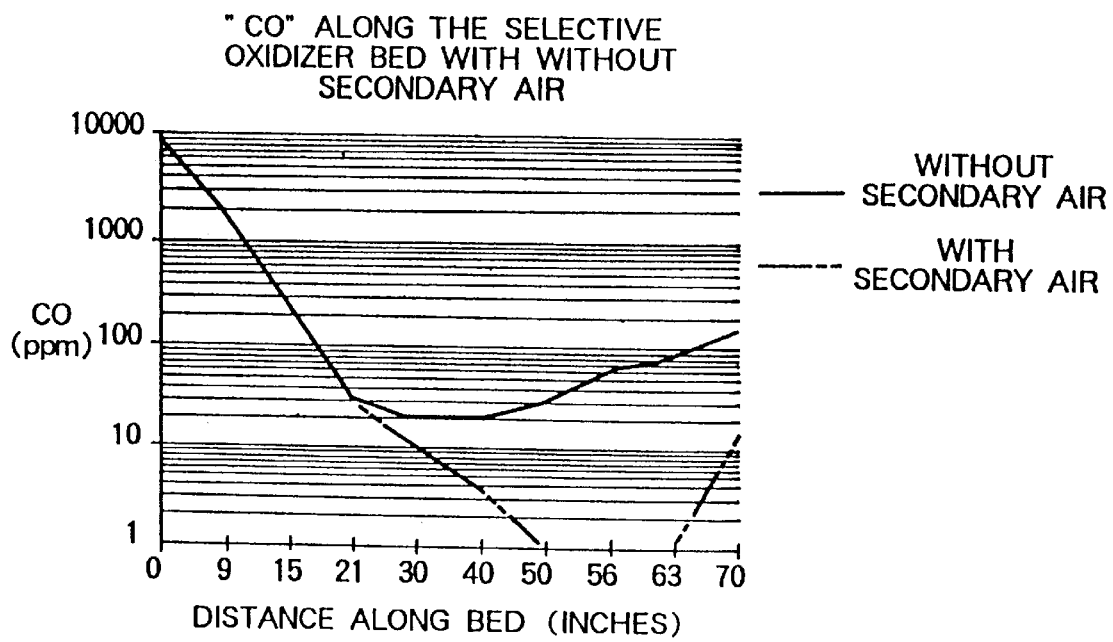
FIG. 25 shows the CO concentration in reformed gases along the catalyst bed of the conventional selective oxidizing reactor.
Figure 26:
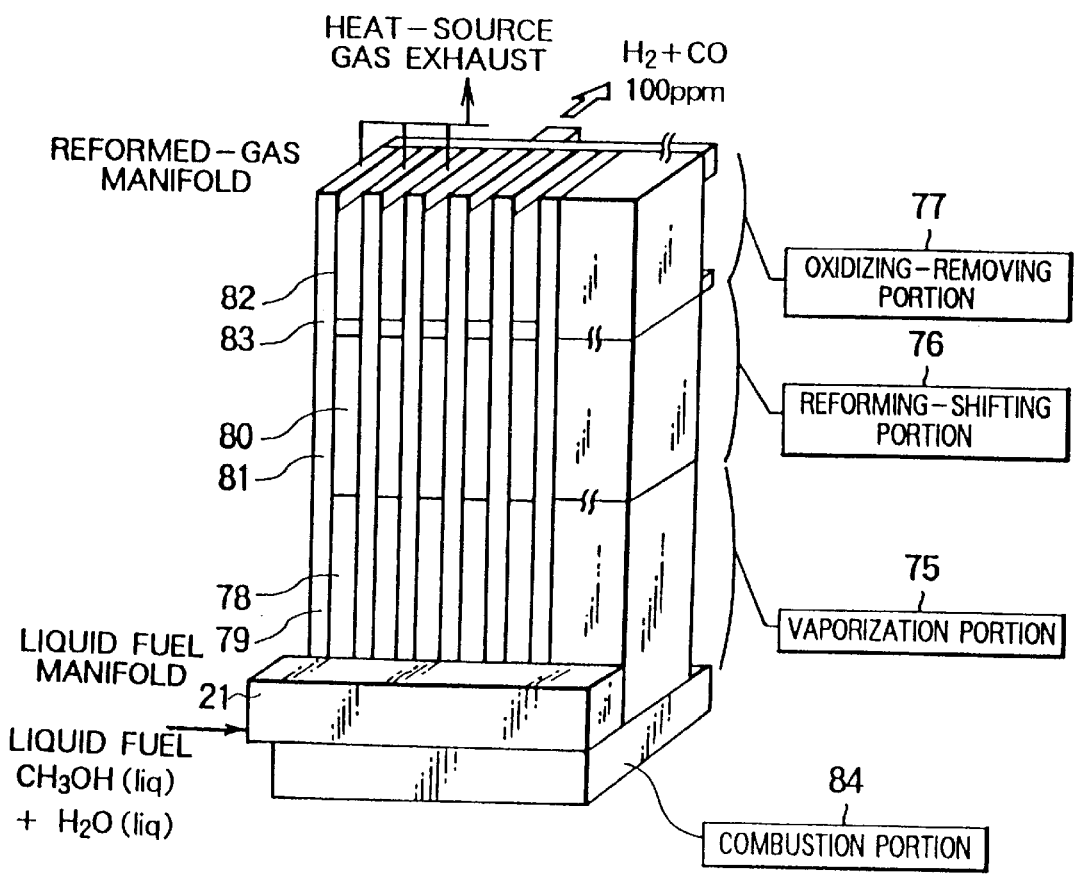
FIG. 26 is a schematic view showing the structure of a conventional methanol reformer.

The reformed gases from the shift reaction portion 4a through the CO oxidization portion 5a of the first stage, and the temperature distribution will be a temperature of 250 to 180° C., if the temperatures of the shift reaction portion and the water evaporation portion are set to predetermined temperatures, as shown in FIG. 19B. Thereafter, the reformed gases pass the CO oxidization portion 5b of the second stage. The temperature distribution here is also within a temperature of 180 to 100° C. between the temperatures of the water evaporation portion and the methanol evaporation portion. The reformed gases flow to the CO oxidization portion 5c of the third stage, and the temperature distribution here is also within a temperature of 100 to 60° C.

Thus, in the constitution of this embodiment, by two-stage structure comprising a methanol evaporation portion and a water evaporation portion, it becomes possible to set two different temperature levels utilizing the evaporation phenomena of liquid feed (methanol and water) of two kinds within a range of temperature suitable for CO oxidization, and consequently, the temperature range suitable for CO oxidization can be reliably put within the entire temperature distribution of the CO oxidization portion. Additionally, even when the flow amount of methanol or reformed gases was varied due to load variation, it would be possible to set a stable temperature distribution to the CO oxidization portion by the fact that two evaporation portions with a large thermal capacity exist interiorly of the CO oxidization portion.

In the aforementioned embodiments, while liquid feed have been described with water and alcohol, liquid feed may also be water and hydrocarbon.

According to the present invention, flat plate elements comprising a liquid feed heating portion, a CO oxidization portion, an evaporation portion, a heat recovery portion, a shift reaction portion, a steam superheating portion, a reforming portion, and a catalytic combustion portion are formed integrally with one another, and the stacked order of the flat plate element is determined, thereby obtaining a continuous, smooth temperature distribution along the stacked direction. Accordingly, there are the advantages that efficient heat exchange can be performed between low-temperature liquid feed, superheated steam, combustion air, high-temperature reformed gases, and combustion gases through heat-transfer fins and also a stacked-direction temperature distribution suitable for the function of each flat plate element can be achieved.

Also, since the liquid feed heating portion, CO oxidization portion, evaporation portion, heat recovery portion, shift reaction portion, steam superheating portion, reforming portion, and catalytic combustion portion are formed integrally with one another, the effective heat exchange between the liquid feed and the reformed gases or combustion gases becomes possible and external heat exchangers are rendered unnecessary. Also, the entire apparatus can be made significantly compact. Furthermore, the flat plate elements having manifolds on the circumference and heat-transfer fins in the interior can be formed from an alloy, such as an aluminum alloy, suitable for pressing and stamping. Accordingly, there is the advantage that a fuel reforming apparatus suitable for workability and mass production can be provided.

According to the present invention, the catalytic combustion portion is divided into a plurality of portions and inserted between the reforming portion and the steam superheating portion, and the reforming portion is stacked in contact with the fuel chamber of the catalytic combustion portion. Accordingly, there are the advantages that stable supply of steam and stable superheating of steam can be reliably performed and also the heat of the catalytic combustion portion can be effectively transferred to the reforming portion.

According to the present invention, the catalytic combustion portion is divided into a plurality of portions and inserted between the evaporation portion and the shift reaction portion, and the evaporation portion is stacked in contact with the fuel chamber of the catalytic combustion portion. Accordingly, there are the advantages that stable supply of steam and stable superheating of steam can be reliably performed and also the heat of the catalytic combustion portion can be effectively transferred to the evaporation portion.

According to the present invention, the heat recovery portion is divided into a plurality of portions and inserted between the evaporation portion and the CO oxidization portion. Accordingly, there are the advantages that stable supply of steam can be reliably performed and the CO oxidization portion can be maintained at a suitable temperature without the supercooling of the CO oxidization portion.

According to the present invention, the heat recovery portion is divided into a plurality of portions and inserted between the evaporation portion and the shift reaction porion. Accordingly, there are the advantages that stable supply of steam and stable superheating of steam can be reliably performed and the heat of the heat recovery portion can be effectively transferred to the evaporation portion.

According to the present invention, the flat plate elements comprising the catalytic combustion portion, reforming portion, steam superheating portion, heat recovery portion, shift reaction portion, CO oxidization portion, and liquid feed heating portion are stacked. Also, the reforming portion or the catalytic combustion portion is provided in the center of the stacked body, and the other flat plate elements are symmetrically disposed on the upper and lower layers of either the reforming portion or the catalytic combustion portion for reformation. Furthermore, adiabatic members are provided on side surfaces of the stacked body. Accordingly, there is the advantage that the heat loss from upper and lower surfaces and side surfaces can be reduced.

According to the present invention, the heat recovery portion, the CO oxidization portion, and the reforming portion are constituted by stacking flat plate elements provided with turn-back passages along the flows of the reformed gases and the combustion gases. Therefore, since an effective area for heat transfer and reaction can be enlarged, there is the advantage that the exhaust heat of combustion gases can be effectively utilized. Also, there is the advantage that the amount of catalysts necessary and enough for reaction are ensured so that reaction rate can be enhanced.

In addition, in the reforming portion provided with turn-back passages, methanol and steam first flows to both end portions of the reforming portion adjacent to the high-temperature catalytic combustion portion, so that many reforming reactions take place at the high-temperature portion. Accordingly, there is the advantage that the generation of heat due to catalytic combustion can be more effectively utilized in the absorption of heat of the reforming reaction. The reformed gases flow out from the low-temperature central portion of the reforming portion. Accordingly, there is the advantage that the CO concentration of the reformed gases can be reduced.

According to the present invention, the CO oxidization portion has temperature distribution which is high in temperature at the inlet and low in temperature at the outlet. Accordingly, there are the advantages that reaction rate is increased at the high-temperature inlet, thereby promoting CO oxidization, and CO generation due to reverse shift reaction is suppressed at the low-temperature outlet, thereby achieving a further reduction in the CO concentration.

In addition, at the boundary surface between reformed gases and liquid feed, a heat conductor or a heat insulator is provided in correspondence with flow. With this, the liquid feed which has been raised to a high temperature through heat exchange can be prevented from again rising in temperature through the heat exchange between the liquid feed and the reformed gases. Accordingly, there is the advantage that the CO oxidization portion can have an effective temperature distribution by promoting the heat exchange of the reformed gases.

According to the present invention, in order to control the CO oxidization air amount distribution in a direction of flow, air dispersion plates with a plurality of dispersion holes are provided in the interior of the CO oxidization portion, thereby performing the mutual diffusion of air and reformed gases in a stacked direction. The gas passage amount distribution in the stacked direction is controlled by the configuration of the dispersion hole and the resistance of a fluid passage leading to the dispersion hole. Accordingly, there are the advantages that air necessary for CO oxidization can be reliably supplied over the entire region of the CO oxidization portion in the direction of flow, and the CO concentration in the reformed gases can be reduced to an allowable level for fuel cells.

According to the present invention, the surface of the heat recovery portion is divided into an evaporation catalytic combustion portion and a combustion gas heat recovery portion. Accordingly, there is the advantage that the exhaust heat of combustion gases can be effectively utilized in the evaporation of liquid feed. Also, the evaporation catalytic combustion portion and the combustion gas heat recovery portion are disposed so that they appear alternately on the surface along a flow of steam on the evaporation surface. Accordingly, there is the advantage that liquid feed can be stably evaporated with reliability. Additionally, since the combustion gases of an upstream catalytic combustion portion are collectively supplied to the combustion gas heat recovery portion, there is the advantage that effective heat recovery can be performed.

According to the present invention, an evaporation temperature corresponding to liquid feed is set by varying an area rate of the evaporation catalytic combustion portion and the combustion gas heat recovery portion in the surface-division heat recovery portion. Accordingly, there is the advantage that a suitable evaporation temperature corresponding to the kind of liquid feed can be set.

According to the present invention, the evaporation portion is constituted by two stages, a liquid feed evaporation portion and a water evaporation portion. Therefore, a suitable evaporation temperature can be set to the respective portions, and evaporation of liquid fuel and water can be stably performed. Also, the CO oxidization portion has three-stage structure and is provided between two stages of evaporation portions and on both sides of the two stages of evaporation portions. Accordingly, a temperature range suitable for CO oxidization can be reliably set within the entire temperature distribution of the CO oxidization portion. Even when the flow amount was varied due to load variation, it would be possible to set a stable temperature distribution to the CO oxidization portion by the fact that two evaporation portions with a large thermal capacity exist interiorly of the CO oxidization portion. Additionally, there is the advantage that reformed gases with a low CO concentration can be stably supplied to fuel cells.

According to the present invention, the area ratio of the evaporation catalytic combustion portion to the combustion gas heat recovery portion is reduced at a portion adjacent to the liquid feed evaporation portion where the evaporation temperature is low, and is increased at a portion adjacent to the water evaporation portion where the evaporation temperature is high. Accordingly, there are the advantages that an evaporation temperature suitable for respective liquids can be set.

What is claimed is:

1. A fuel reforming apparatus comprising portions which include:
   a liquid feed heating portion for heating liquid feed which comprises water and alcohol or hydrocarbon;
   an evaporation portion for evaporating the heated liquid feed to generate feed gases;
   a steam superheating portion for superheating the feed gases from an evaporation temperature to a reforming temperature;
   a reforming portion for generating hydrogen-rich reformed gases from the superheated feed gases by reforming catalysts;

a catalytic combustion portion for supplying reforming heat to said reforming portion and evaporation heat to said evaporation portion and said steam superheating portion from heat generated by catalytic combustion;

a CO oxidization portion for reducing CO contained in the reformed gases that pass through and emerge from said catalytic combustion portion by catalytic oxidization; and a heat recovery portion for using exhaust heat from high-temperature combination gases obtained by catalytic combustion as heat sources for said steam superheating portion and said evaporation portion; and wherein each of said portions are formed of flat plate elements made of a light alloy, the flat plate elements having a manifold for performing intake and exhaust with respect to their periphery and heat-transfer fins in the interior thereof, and said flat plate elements being stacked into an integral construction such that said catalytic combustion portion, reforming portion, steam superheating portion, heat recovery portion, evaporation portion, CO oxidization portion, and liquid feed heating portion are in close proximity to one another from the catalytic combustion portion at a high-temperature side to the liquid feed heating portion at a low-temperature side.

2. The fuel reforming apparatus as set forth in claim 1, wherein said catalytic combustion portion is divided into a plurality of portions and inserted between the reforming portion and the steam superheating portion and wherein a fuel portion of said catalytic combustion portion and the reforming portion are stacked in contact with each other.

3. The fuel reforming apparatus as set forth in claim 1, wherein said heat recovery portion is divided into a plurality of portions and inserted between the evaporation portion and the CO oxidization portion and wherein said heat recovery portion and said evaporation portion are stacked in contact with each other.

4. The fuel reforming apparatus as set forth in claim 1, wherein, when stacking the flat plate elements of said catalytic combustion portion, reforming portion, steam superheating portion, heat recovery portion, evaporation portion, CO oxidation portion and liquid feed heating portion to define a main stacked body, a pair of said reforming portions or a pair of catalytic combustion portions is provided in the center of said main stacked body, wherein said main stacked body comprises first and second identical stacked bodies that are symmetrically stacked about a symmetrical plane.

5. The fuel reforming apparatus as set forth in claim 1, wherein:

said CO oxidization portion and reforming portion each further comprises a flat plate element having heat-transfer fins fixed to the interior, each heat-transfer fin of the CO oxidization portion flat plate element and the reforming portion plate element being filled on the inner side with a CO oxidization catalyst or a reforming catalyst, respectively;

said heat recovery portion and steam superheating portion each further comprises a flat plate element having a combustion gas passage and a steam passage formed with heat-transfer fins alone; and said flat plate elements are stacked by providing at least one fluid turn-back passage in a stacked direction of said flat plate elements so that fluid turns back at an end of said flat plate element, when said fluid passes the inner side of each heat-transfer fin.

6. The fuel reforming apparatus as set forth in claim 5, wherein said CO oxidization portion comprises flat plate elements provided with one or more turn-back passages, the evaporation portion is provided in contact with the flat plate element of an inlet of said CO oxidization portion into which the reformed gases flow, the liquid feed heating portion is provided in contact with the flat plate element of an outlet of said CO oxidization portion from which the reformed gases flow out, a heat conductor is provided on a boundary surface where the flows of said reformed gases and said liquid feed and steam become opposite flows, and a heat insulator is provided on a boundary surface where the flows of said reformed gases and said liquid feed and steam become parallel flows, thereby obtaining temperature distribution which is high in temperature at the inlet portion and low in temperature at the outlet portion in the stacked direction of said CO oxidization portion and in the directions of said reformed gases and said liquid feed and steam.

7. The fuel reforming apparatus as set forth in claim 5, wherein said CO oxidization portion dispersedly supplies CO oxidization air in correspondence with the CO concentration distribution along a direction of flow in said CO oxidization portion, by alternately stacking a plurality of turn-back passages of reformed-gas chambers and CO oxidization air chambers so that the flows of the reformed gases and the CO oxidization air become parallel flows and also by providing a CO oxidization air dispersion plate with a plurality of dispersion holes between flat plate elements of the reformed-gas chambers and the CO oxidization air chambers so that the air amount distribution in the stacked direction is controlled by the configuration of the dispersion hole and the passage resistance of a fluid passage leading to the dispersion hole.

8. The fuel reforming apparatus as set forth in claim 1, wherein a surface-division heat recovery portion, formed by dividing a surface of the heat recovery portion into an evaporation catalytic combustion portion and a combustion gas heat recovery portion, is provided in close proximity to an upper or lower portion of the evaporation portion and wherein said evaporation catalytic combustion portion and said combustion gas heat recovery portion are alternately disposed on the surface along a flow of steam on the evaporation surface of said evaporation portion.

9. The fuel reforming apparatus as set forth in claim 8, wherein an evaporation temperature corresponding to liquid feed is set by varying the ratio of the areas of the evaporation catalytic combustion portion and the combustion gas heat recovery portion in said surface-division heat recovery portion.

10. The fuel reforming apparatus as set forth in claim 8, wherein:

the evaporation portion is formed by two stages, a liquid feed evaporation portion and a water evaporation portion;

a surface-division heat recovery portion is formed by dividing a surface of the heat recovery portion into an evaporation catalytic combustion portion and a combustion gas heat recovery portion;

said liquid feed evaporation portion and said water evaporation portion are provided in close proximity to said surface-division heat recovery portion, respectively; and CO oxidization portions are stacked between said liquid feed evaporation portion and said water evaporation portion and outside said liquid feed evaporation portion and said water evaporation portion, respectively.

11. The fuel reforming apparatus as set forth in claim 10, wherein an area ratio of the evaporation catalytic combustion portion to said combustion gas heat recovery portion is reduced at a portion adjacent to the liquid feed evaporation portion where the evaporation temperature is low, and is increased at a portion adjacent to the water evaporation portion where the evaporation temperature is high.

12. A fuel reforming apparatus comprising portions which include:

a liquid feed heating portion for heating liquid feed which comprises water and alcohol or hydrocarbon;

an evaporation portion for evaporating the heated liquid feed to generate feed gases;

a steam superheating portion for superheating the feed gases from an evaporation temperature to a reforming temperature;

a reforming portion for generating hydrogen-rich reformed gases from the superheated feed gases by reforming catalysts;

a catalytic combustion portion for supplying reforming heat to said reforming portion and evaporation heat to said evaporation portion and said steam superheating portion from heat generated by catalytic combustion;

a shift reaction portion for reducing carbon monoxide (CO) contained in the reformed gases generated by said reforming portion;

a CO oxidization portion for reducing the CO contained in the reformed gases emerging from said shift reaction portion by catalytic oxidization; and a heat recovery portion for using exhaust heat from high-temperature combustion gases obtained by catalytic combustion as heat sources for said steam superheating portion and said evaporation portion; and wherein each of said portions are formed of flat plate elements made of a light alloy, the flat plate elements having a manifold for performing intake and exhaust with respect to their periphery and heat-transfer fins in the interior thereof, and said flat plate elements being stacked into an integral construction such that said catalytic combustion portion, reforming portion, steam superheating portion, heat recovery portion, shift reaction portion, evaporation portion, CO oxidization portion, and liquid feed heating portion are in close proximity to one another from a high-temperature side to a low-temperature side.

13. The fuel reforming apparatus as set forth in claim 12, wherein said catalytic combustion portion is divided into a plurality of portions and inserted between the shift reaction portion and the evaporation portion and wherein a fuel portion of said catalytic combustion portion and the evaporation portion are stacked in contact with each other.

14. The fuel reforming apparatus as set forth in claim 12, wherein said heat recovery portion is divided into a plurality of portions and inserted between the evaporation portion and said heat recovery portion and wherein said shift reaction portion and said evaporation portion are stacked in contact with each other.

* * * * *